US012677163B2

(12) United States Patent
Kumar

(10) Patent No.: US 12,677,163 B2
(45) Date of Patent: Jul. 7, 2026

(54) CROSS-SUBSCRIPTION MEASUREMENTS FOR A USER EQUIPMENT

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 653 days.

(21) Appl. No.: 17/949,795

(22) Filed: Sep. 21, 2022

(65) Prior Publication Data

US 2024/0098522 A1      Mar. 21, 2024

(51) Int. Cl.
*H04W 24/02* (2009.01)
*H04W 8/24* (2009.01)
(Continued)

(52) U.S. Cl.
CPC ........... *H04W 24/02* (2013.01); *H04W 24/10* (2013.01); *H04W 72/51* (2023.01); *H04W 72/542* (2023.01); *H04W 88/06* (2013.01)

(58) Field of Classification Search
None
See application file for complete search history.

(56) References Cited

U.S. PATENT DOCUMENTS 8,934,460 B1    1/2015  Hu et al.
9,031,066 B2    5/2015  Hong et al.
(Continued)

FOREIGN PATENT DOCUMENTS

EP            3016455 A1    5/2016
WO      WO-2021002859 A1    1/2021
WO      WO-2021035458 A1    3/2021

OTHER PUBLICATIONS

Moderator (NTT Docomo), et al., "Summary on UE Features for NR Coverage Enhancement", 3GPP TSG RAN WG1 #106bis-e, R1-2109714, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 19, 2021, XP052062113, 40 Pages, p. 21.
(Continued)

*Primary Examiner* — Mansour Oveissi
*Assistant Examiner* — Ning Li
(74) *Attorney, Agent, or Firm* — Holland & Hart LLP/Qualcomm Incorporated

(57) ABSTRACT

Methods, systems, and devices for wireless communications are described. In some systems, a user equipment (UE) may support multi-subscriber identity module (SIM) operation in dual SIM dual active (DSDA) deployments. In some aspects, the UE may dynamically allocate its hardware capabilities between a first network subscription and a second network subscription based on current or predicted future network conditions. The UE may predict future network conditions based on past and/or current measurement reports of network conditions. In some aspects, a UE may determine that a first network subscription's hardware capability is better suited to perform one or more network measurements assigned to a second network subscription of the UE. The UE may perform one or more network measurements assigned to the second network subscription via the first network subscription, and then transmit the report to the network via the second network subscription.

24 Claims, 14 Drawing Sheets

(51) Int. Cl.
    *H04W 24/10*         (2009.01)
    *H04W 72/51*         (2023.01)
    *H04W 72/542*       (2023.01)
    *H04W 88/06*         (2009.01)

(56)            References Cited

U.S. PATENT DOCUMENTS

| | | |
|---|---|---|
| 9,374,786 B1 | 6/2016 | Maheshwari et al. |
| 10,237,841 B1 | 3/2019 | Krishnamurthy et al. |
| 11,503,615 B2 | 11/2022 | Hu et al. |
| 2009/0245213 A1 | 10/2009 | Zaki et al. |
| 2013/0237257 A1 | 9/2013 | Walke et al. |
| 2014/0213235 A1 | 7/2014 | Lou et al. |
| 2015/0080008 A1 | 3/2015 | Ngai et al. |
| 2015/0139015 A1 | 5/2015 | Kadous et al. |
| 2015/0245309 A1 | 8/2015 | Nayak et al. |
| 2015/0264602 A1 | 9/2015 | Hageltorn et al. |
| 2015/0289314 A1 | 10/2015 | Yang et al. |
| 2015/0296520 A1 | 10/2015 | Batchu et al. |
| 2015/0327159 A1 | 11/2015 | Gude et al. |
| 2015/0327329 A1 | 11/2015 | Zhou |
| 2015/0334574 A1 | 11/2015 | Krishnamoorthy et al. |
| 2015/0349869 A1 | 12/2015 | Sun et al. |
| 2015/0382361 A1 | 12/2015 | Sabapathi et al. |
| 2016/0007312 A1 | 1/2016 | Cherry et al. |
| 2016/0007370 A1 | 1/2016 | Kotreka et al. |
| 2016/0021520 A1 | 1/2016 | Gudu et al. |
| 2016/0050686 A1 | 2/2016 | Krishnamoorthi et al. |
| 2016/0094316 A1 | 3/2016 | Fanous et al. |
| 2016/0095157 A1 | 3/2016 | Wenzel et al. |
| 2016/0142087 A1* | 5/2016 | Inampudi .............. H04W 48/16 |
| | | 455/558 |
| 2016/0174232 A1 | 6/2016 | Krishnamoorthy et al. |
| 2016/0204908 A1 | 7/2016 | Rafique et al. |
| 2016/0219608 A1 | 7/2016 | Awoniyi-Oteri et al. |
| 2016/0219648 A1 | 7/2016 | Awoniyi-Oteri et al. |
| 2016/0227557 A1 | 8/2016 | Fanous et al. |
| 2016/0302114 A1* | 10/2016 | Jain .................... H04W 36/304 |
| 2016/0315744 A1 | 10/2016 | Choi et al. |
| 2017/0026985 A1 | 1/2017 | Lindoff et al. |
| 2017/0048855 A1 | 2/2017 | Garg et al. |
| 2017/0064762 A1 | 3/2017 | Ramasamy et al. |
| 2017/0071021 A1 | 3/2017 | Jin et al. |
| 2017/0094628 A1 | 3/2017 | Miao et al. |
| 2017/0118737 A1 | 4/2017 | Batchu et al. |
| 2017/0164398 A1 | 6/2017 | Rajaee et al. |
| 2017/0171902 A1 | 6/2017 | Tillman et al. |
| 2017/0265114 A1 | 9/2017 | Sahu et al. |
| 2017/0359813 A1* | 12/2017 | Lee .................. H04W 52/0212 |
| 2018/0139788 A1 | 5/2018 | Jhunjhunwala et al. |
| 2018/0146365 A1 | 5/2018 | Dhanapal et al. |
| 2018/0160422 A1 | 6/2018 | Pathak et al. |
| 2018/0324595 A1 | 11/2018 | Shima |
| 2019/0090280 A1 | 3/2019 | Krishnamoorthy et al. |
| 2019/0098597 A1 | 3/2019 | Basu Mallick et al. |
| 2019/0132090 A1 | 5/2019 | Jarrahi Khameneh et al. |
| 2019/0166534 A1 | 5/2019 | Williammee et al. |
| 2019/0174361 A1 | 6/2019 | Fu et al. |
| 2019/0222380 A1 | 7/2019 | Manolakos et al. |
| 2019/0349760 A1 | 11/2019 | Fong et al. |
| 2020/0045615 A1 | 2/2020 | Karimli et al. |
| 2020/0170063 A1 | 5/2020 | Hu et al. |
| 2020/0196192 A1 | 6/2020 | Fazel Sarjoui et al. |
| 2020/0245233 A1 | 7/2020 | Qian et al. |
| 2020/0382968 A1 | 12/2020 | Gupta et al. |
| 2021/0014095 A1 | 1/2021 | Ly et al. |
| 2021/0014666 A1 | 1/2021 | Baskar et al. |
| 2021/0014667 A1 | 1/2021 | Lovlekar et al. |
| 2021/0014935 A1* | 1/2021 | Gozalvez Serrano ...................... |
| | | H04W 88/06 |
| 2021/0029773 A1 | 1/2021 | Majumder et al. |
| 2021/0076438 A1 | 3/2021 | Lee et al. |
| 2021/0089026 A1 | 3/2021 | Bender et al. |
| 2021/0105606 A1 | 4/2021 | Bendlin et al. |
| 2021/0105740 A1 | 4/2021 | Huang et al. |
| 2021/0105791 A1 | 4/2021 | Wang et al. |
| 2021/0226833 A1 | 7/2021 | Park et al. |
| 2021/0243632 A1 | 8/2021 | Pezeshki et al. |
| 2021/0282103 A1 | 9/2021 | Zhu et al. |
| 2021/0282206 A1 | 9/2021 | Zhu et al. |
| 2021/0345432 A1 | 11/2021 | Yang et al. |
| 2021/0409133 A1 | 12/2021 | Pezeshki et al. |
| 2022/0007363 A1 | 1/2022 | Wang et al. |
| 2022/0039047 A1 | 2/2022 | Tsai et al. |
| 2022/0069873 A1 | 3/2022 | Gopal et al. |
| 2022/0116161 A1 | 4/2022 | Jones et al. |
| 2022/0123889 A1 | 4/2022 | Levitsky et al. |
| 2022/0124544 A1 | 4/2022 | Jha et al. |
| 2022/0132612 A1 | 4/2022 | Chang et al. |
| 2022/0132613 A1 | 4/2022 | Chang et al. |
| 2022/0141720 A1 | 5/2022 | Jha et al. |
| 2022/0182906 A1 | 6/2022 | Bettappanavar et al. |
| 2022/0201678 A1 | 6/2022 | Chang et al. |
| 2022/0210856 A1 | 6/2022 | Zhang et al. |
| 2022/0225240 A1 | 7/2022 | Fakoorian et al. |
| 2022/0225322 A1 | 7/2022 | Shim et al. |
| 2022/0240079 A1 | 7/2022 | Lovlekar et al. |
| 2022/0248259 A1 | 8/2022 | Lei et al. |
| 2022/0256410 A1 | 8/2022 | Zhang |
| 2022/0272688 A1 | 8/2022 | Lee et al. |
| 2022/0278728 A1 | 9/2022 | Vankayala et al. |
| 2022/0286839 A1 | 9/2022 | Zhao et al. |
| 2022/0286994 A1 | 9/2022 | Singh et al. |
| 2022/0295445 A1 | 9/2022 | Göktepe et al. |
| 2022/0303869 A1 | 9/2022 | Paradkar et al. |
| 2022/0303937 A1 | 9/2022 | Wu et al. |
| 2022/0312347 A1 | 9/2022 | Cherian et al. |
| 2022/0322476 A1 | 10/2022 | Li et al. |
| 2022/0338258 A1 | 10/2022 | Xie et al. |
| 2022/0361132 A1 | 11/2022 | Gurumoorthy et al. |
| 2022/0369211 A1 | 11/2022 | Agiwal et al. |
| 2022/0369246 A1 | 11/2022 | Lin et al. |
| 2022/0377658 A1 | 11/2022 | Gudivada et al. |
| 2022/0386151 A1 | 12/2022 | Eger et al. |
| 2022/0394530 A1* | 12/2022 | Kanneath Abraham ..................... |
| | | H04W 24/10 |
| 2022/0394605 A1 | 12/2022 | Wang et al. |
| 2022/0394712 A1 | 12/2022 | Shahi et al. |
| 2022/0408328 A1 | 12/2022 | Adjakple et al. |
| 2022/0418020 A1 | 12/2022 | Adjakple et al. |
| 2023/0007624 A1 | 1/2023 | Murray et al. |
| 2023/0010736 A1 | 1/2023 | Hebein et al. |
| 2023/0011024 A1 | 1/2023 | Hebein et al. |
| 2023/0037290 A1 | 2/2023 | Taherzadeh Boroujeni et al. |
| 2023/0047213 A1 | 2/2023 | Chen et al. |
| 2023/0048785 A1 | 2/2023 | Ngai et al. |
| 2023/0057052 A1 | 2/2023 | Elshafie et al. |
| 2023/0068437 A1 | 3/2023 | Narayanan et al. |
| 2023/0075568 A1 | 3/2023 | Kanneath Abraham |
| 2023/0088766 A1 | 3/2023 | Qin et al. |
| 2023/0091739 A1 | 3/2023 | Sabouri-Sichani et al. |
| 2023/0108535 A1 | 4/2023 | Sridharan et al. |
| 2023/0117026 A1 | 4/2023 | Gopal et al. |
| 2023/0122569 A1 | 4/2023 | Sriram et al. |
| 2023/0123352 A1* | 4/2023 | Hong ................... H04W 24/10 |
| | | 370/329 |
| 2023/0171828 A1 | 6/2023 | Wang et al. |
| 2023/0179369 A1 | 6/2023 | Xu et al. |
| 2023/0180170 A1 | 6/2023 | Shukair et al. |
| 2023/0199565 A1 | 6/2023 | Vannithamby et al. |
| 2023/0199576 A1* | 6/2023 | Hong ...................... H04W 8/20 |
| | | 370/331 |
| 2023/0199602 A1 | 6/2023 | Li et al. |
| 2023/0216711 A1 | 7/2023 | Yao et al. |
| 2023/0239802 A1 | 7/2023 | Kumar |
| 2023/0254918 A1 | 8/2023 | Gurumoorthy et al. |
| 2023/0262446 A1 | 8/2023 | Kim et al. |
| 2023/0262452 A1 | 8/2023 | Yao et al. |
| 2023/0262635 A1 | 8/2023 | Tan et al. |
| 2023/0269636 A1 | 8/2023 | Lee et al. |
| 2023/0269818 A1 | 8/2023 | Zhang et al. |
| 2023/0276249 A1 | 8/2023 | Tang et al. |
| 2023/0276522 A1 | 8/2023 | Ghelichi et al. |
| 2023/0284308 A1 | 9/2023 | Prabhakar et al. |

(56)                References Cited

U.S. PATENT DOCUMENTS

| | | | |
|---|---|---|---|
| 2023/0291523 A1 | 9/2023 | Hasegawa et al. | |
| 2023/0299798 A1 | 9/2023 | Zhang | |
| 2023/0308855 A1 | 9/2023 | Matolia et al. | |
| 2023/0337202 A1 | 10/2023 | Pant et al. | |
| 2023/0345416 A1 | 10/2023 | Chin et al. | |
| 2023/0354279 A1 | 11/2023 | Kumar | |
| 2023/0361960 A1 | 11/2023 | Yu et al. | |
| 2023/0370833 A1 | 11/2023 | Zhang | |
| 2023/0397079 A1 | 12/2023 | Mattam et al. | |
| 2023/0422206 A1* | 12/2023 | Jiang | H04W 52/0206 |
| 2024/0007843 A1 | 1/2024 | Shen et al. | |
| 2024/0008011 A1 | 1/2024 | Yu et al. | |
| 2024/0008090 A1 | 1/2024 | Ly et al. | |
| 2024/0023077 A1 | 1/2024 | Yajnanarayana et al. | |
| 2024/0023080 A1 | 1/2024 | Wei et al. | |
| 2024/0023082 A1* | 1/2024 | Mu | H04W 88/00 |
| 2024/0032124 A1 | 1/2024 | Peddiraju et al. | |
| 2024/0048338 A1 | 2/2024 | Zachrison et al. | |
| 2024/0073772 A1 | 2/2024 | Gupta et al. | |
| 2024/0098478 A1 | 3/2024 | Kumar | |
| 2024/0098771 A1 | 3/2024 | Liu et al. | |
| 2024/0121146 A1 | 4/2024 | Nielsen et al. | |
| 2024/0163011 A1 | 5/2024 | Hasegawa et al. | |
| 2024/0163135 A1 | 5/2024 | Liu | |
| 2024/0163762 A1* | 5/2024 | Goto | H04W 36/302 |
| 2024/0179658 A1 | 5/2024 | Zou et al. | |
| 2024/0187281 A1 | 6/2024 | Qiao | |
| 2024/0187898 A1* | 6/2024 | Sabouri-Sichani | H04W 24/10 |
| 2024/0188067 A1 | 6/2024 | Zhang et al. | |
| 2024/0188075 A1 | 6/2024 | Tran et al. | |
| 2024/0188174 A1 | 6/2024 | Jung | |
| 2024/0214869 A1 | 6/2024 | Sha et al. | |
| 2024/0215101 A1 | 6/2024 | Gurumoorthy et al. | |
| 2024/0243958 A1 | 7/2024 | Wang et al. | |
| 2024/0284212 A1* | 8/2024 | Mclean | H04W 24/08 |

OTHER PUBLICATIONS

Moderator (Qualcomm): "FL summary # 4 of PUCCH Coverage Enhancement", 3GPP TSG RAN WG1 #106-e, R1-2108619, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16, 2021-Aug. 27, 2021, XP052042727, p. 24, pp. 1-37.

Qualcomm Incorporated: "Handling of CA for DMRS Bundling", 3GPP TSG-RAN WG4 Meeting #103-e, R4-2210215, 3rd Generation Partnership Project, Mobile Competence Centre, 650, Route Des Lucioles, F-06921 Sophia-Antipolis Cedex, France, vol. RAN WG4, No. May 1, 2022, Apr. 25, 2022, XP052143732, 5 pages, p. 2.

* cited by examiner

Figure 10:
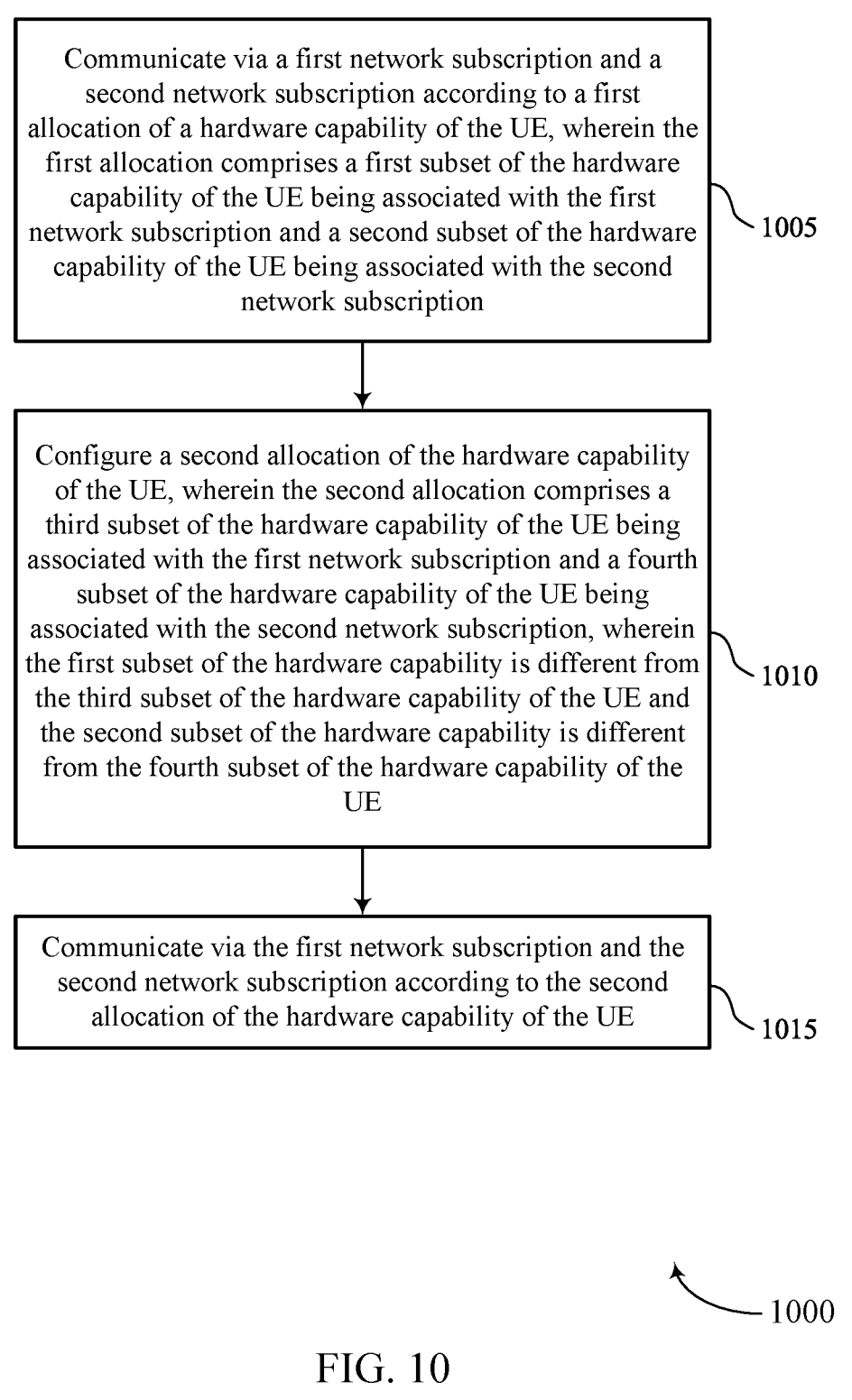

Communicate via a first network subscription and a second network subscription according to a first allocation of a hardware capability of the UE, wherein the first allocation comprises a first subset of the hardware capability of the UE being associated with the first network subscription and a second subset of the hardware capability of the UE being associated with the second network subscription

1005

Configure a second allocation of the hardware capability of the UE, wherein the second allocation comprises a third subset of the hardware capability of the UE being associated with the first network subscription and a fourth subset of the hardware capability of the UE being associated with the second network subscription, wherein the first subset of the hardware capability is different from the third subset of the hardware capability of the UE and the second subset of the hardware capability is different from the fourth subset of the hardware capability of the UE

1010

Communicate via the first network subscription and the second network subscription according to the second allocation of the hardware capability of the UE

Figure 11:
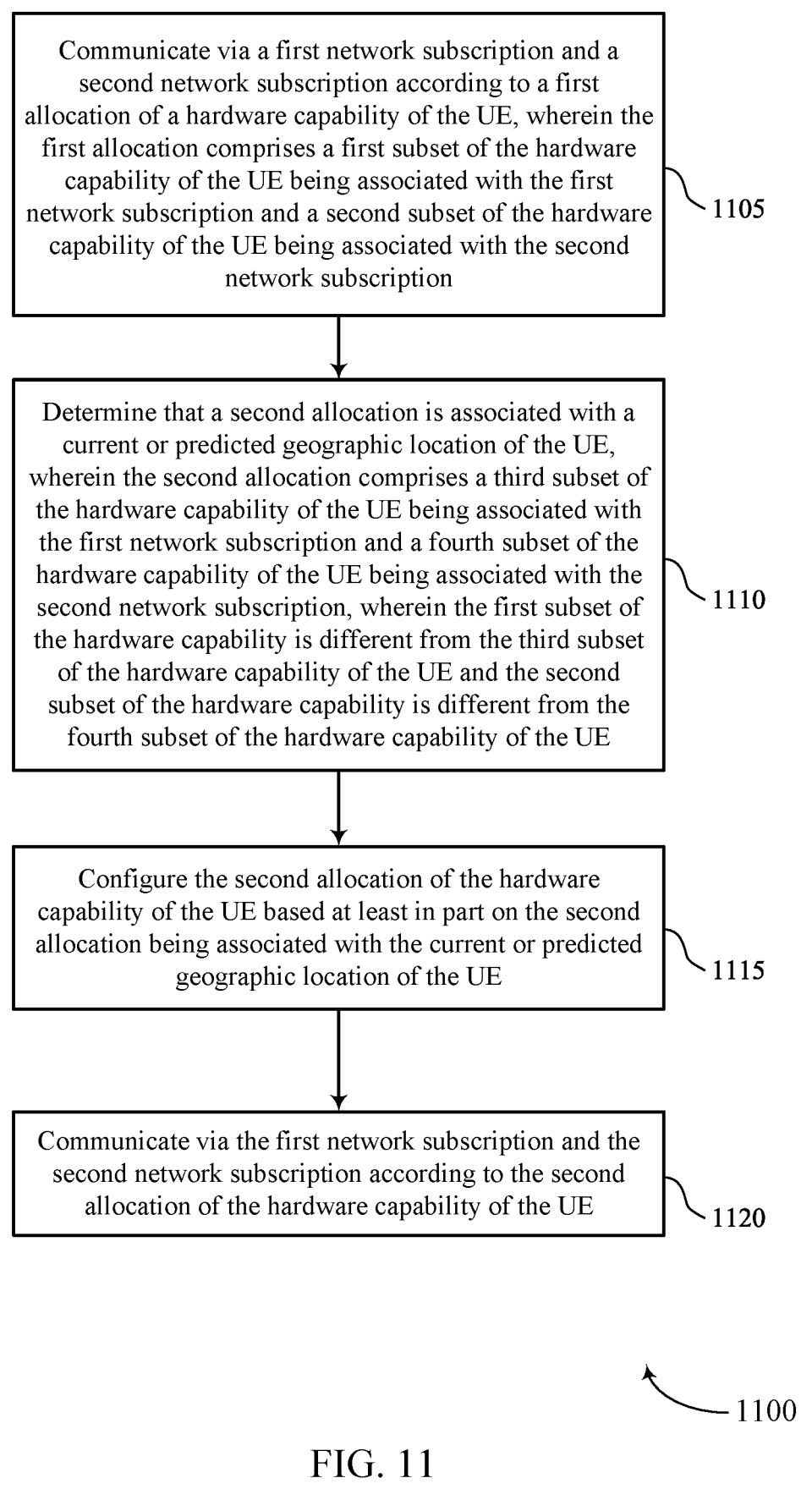

Communicate via a first network subscription and a second network subscription according to a first allocation of a hardware capability of the UE, wherein the first allocation comprises a first subset of the hardware capability of the UE being associated with the first network subscription and a second subset of the hardware capability of the UE being associated with the second network subscription

1105

Determine that a second allocation is associated with a current or predicted geographic location of the UE, wherein the second allocation comprises a third subset of the hardware capability of the UE being associated with the first network subscription and a fourth subset of the hardware capability of the UE being associated with the second network subscription, wherein the first subset of the hardware capability is different from the third subset of the hardware capability of the UE and the second subset of the hardware capability is different from the fourth subset of the hardware capability of the UE

1110

Configure the second allocation of the hardware capability of the UE based at least in part on the second allocation being associated with the current or predicted geographic location of the UE

1115

Communicate via the first network subscription and the second network subscription according to the second allocation of the hardware capability of the UE

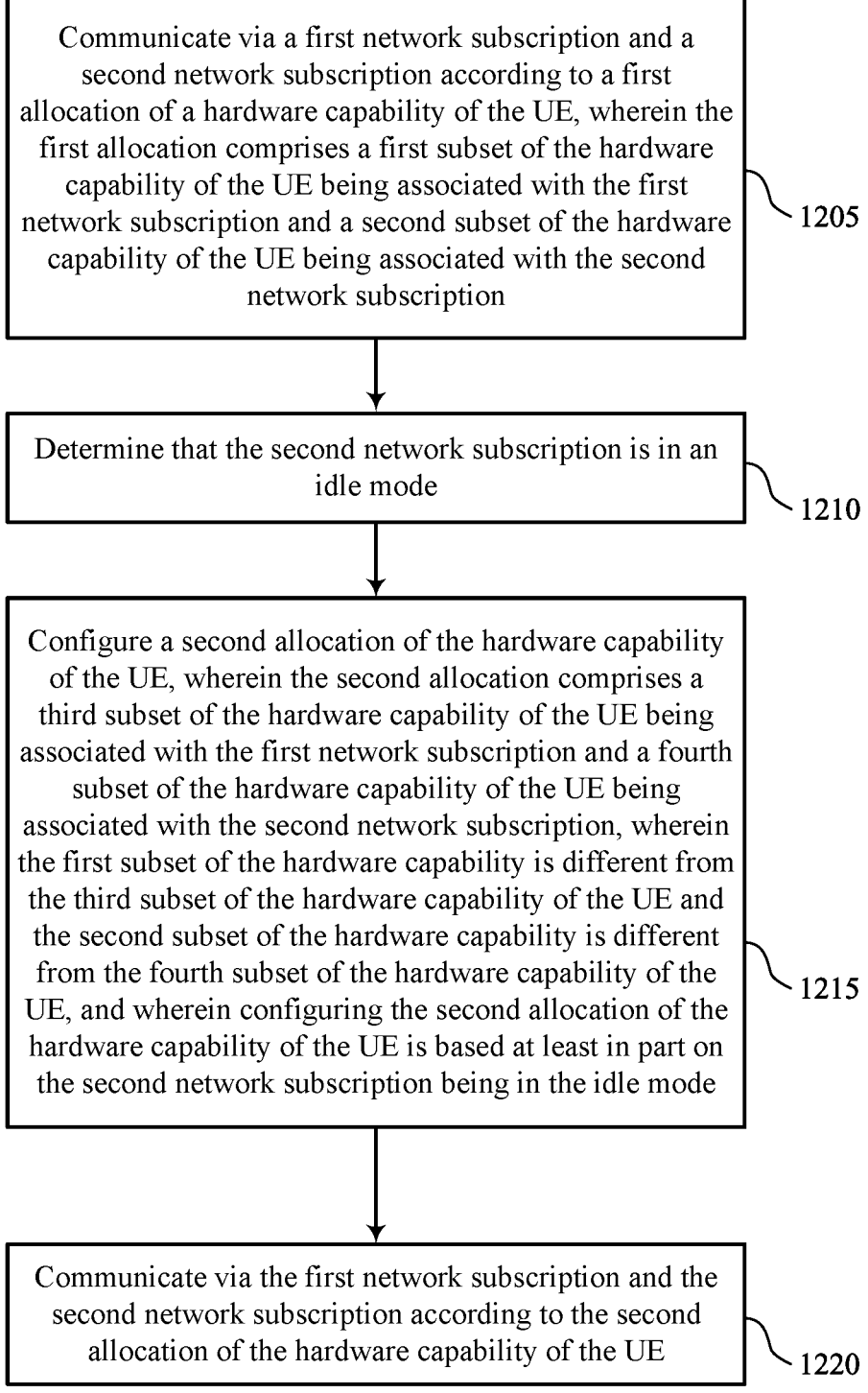

Communicate via a first network subscription and a
second network subscription according to a first
allocation of a hardware capability of the UE, wherein the
first allocation comprises a first subset of the hardware
capability of the UE being associated with the first
network subscription and a second subset of the hardware
capability of the UE being associated with the second
network subscription

1205

Determine that the second network subscription is in an
idle mode

1210

Configure a second allocation of the hardware capability
of the UE, wherein the second allocation comprises a
third subset of the hardware capability of the UE being
associated with the first network subscription and a fourth
subset of the hardware capability of the UE being
associated with the second network subscription, wherein
the first subset of the hardware capability is different from
the third subset of the hardware capability of the UE and
the second subset of the hardware capability is different
from the fourth subset of the hardware capability of the
UE, and wherein configuring the second allocation of the
hardware capability of the UE is based at least in part on
the second network subscription being in the idle mode

1215

Communicate via the first network subscription and the
second network subscription according to the second
allocation of the hardware capability of the UE

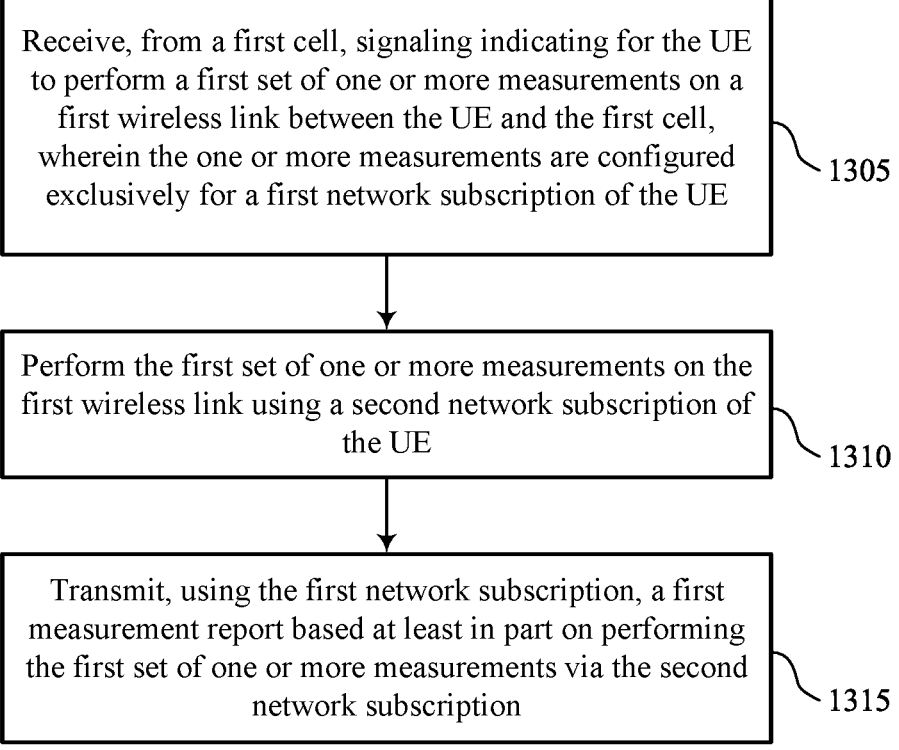

Receive, from a first cell, signaling indicating for the UE to perform a first set of one or more measurements on a first wireless link between the UE and the first cell, wherein the one or more measurements are configured exclusively for a first network subscription of the UE

1305

Perform the first set of one or more measurements on the first wireless link using a second network subscription of the UE

1310

Transmit, using the first network subscription, a first measurement report based at least in part on performing the first set of one or more measurements via the second network subscription

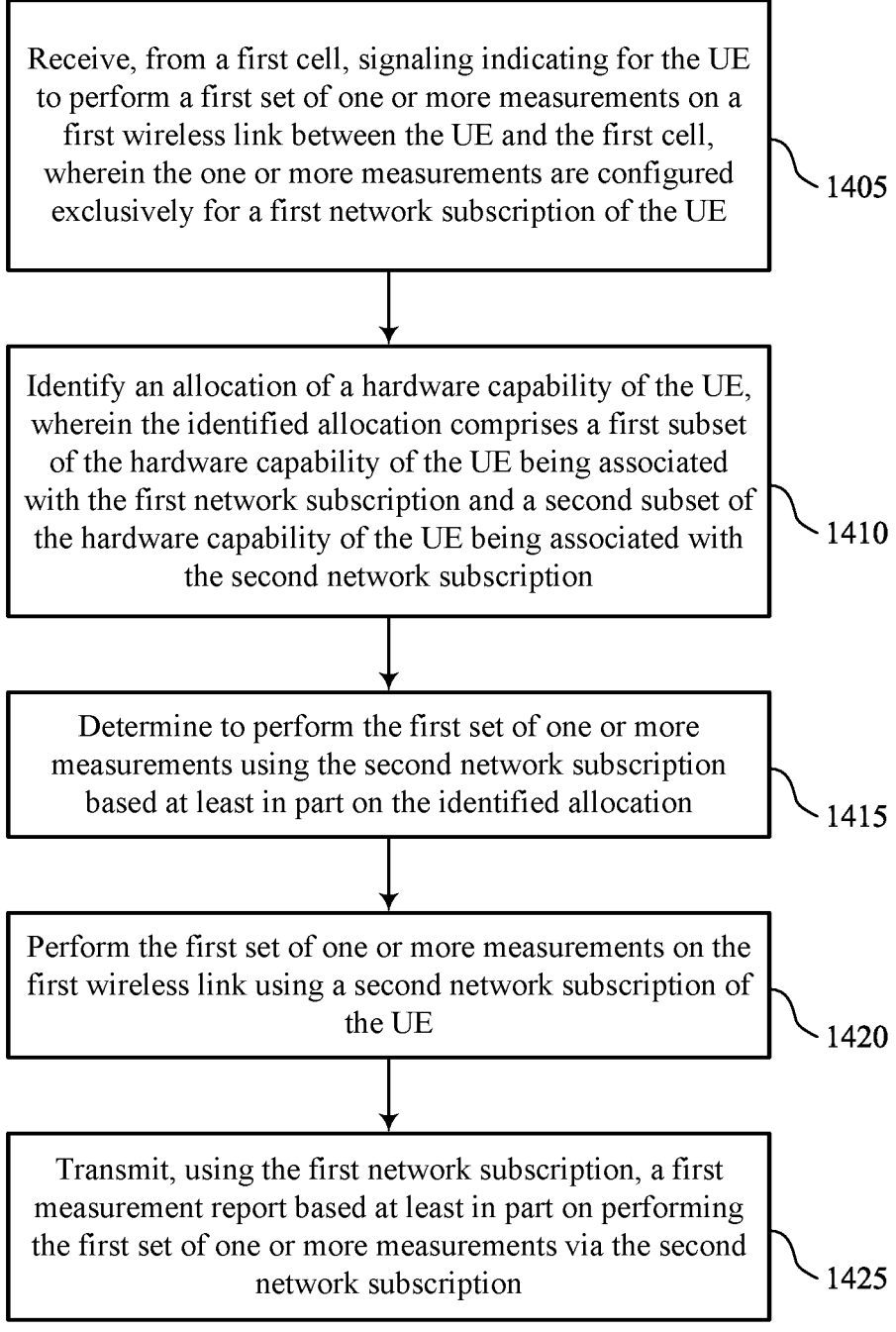

Receive, from a first cell, signaling indicating for the UE to perform a first set of one or more measurements on a first wireless link between the UE and the first cell, wherein the one or more measurements are configured exclusively for a first network subscription of the UE ⟍ 1405

Identify an allocation of a hardware capability of the UE, wherein the identified allocation comprises a first subset of the hardware capability of the UE being associated with the first network subscription and a second subset of the hardware capability of the UE being associated with the second network subscription ⟍ 1410

Determine to perform the first set of one or more measurements using the second network subscription based at least in part on the identified allocation ⟍ 1415

Perform the first set of one or more measurements on the first wireless link using a second network subscription of the UE ⟍ 1420

Transmit, using the first network subscription, a first measurement report based at least in part on performing the first set of one or more measurements via the second network subscription ⟍ 1425

CROSS-SUBSCRIPTION MEASUREMENTS FOR A USER EQUIPMENT

FIELD OF TECHNOLOGY

The following relates to wireless communications, including hardware capability reallocation for a user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support hardware capability reallocation for a user equipment (UE). Generally, the described techniques provide for dynamic allocation of hardware capabilities between a first network subscription and a second network subscription in dual subscriber identity module (SIM) dual active (DSDA) deployments. For example, in some implementations of the present disclosure, a DSDA UE may dynamically allocate its hardware capability to the two network subscriptions based on current or predicted conditions. For instance, a DSDA UE may dynamically allocate its hardware capability to account for recently measured network conditions associated with either or both of the first network subscription and the second network subscription. In some cases, a DSDA UE may determine, based on one or more measurement reports, that a first network that it is communicating with on a lower priority network subscription has a higher capability than a second network subscription that it is communicating with on a higher priority subscription. The DSDA UE may dynamically allocate hardware capability from the higher priority subscription to the lower priority subscription to take advantage of the determined higher capability conditions of the first network. In some examples, the DSDA UE may predict future network conditions based on past measurement reports and then dynamically allocate the DSDA UE's hardware capability between its two subscriptions based on the predicted network conditions. In some examples, the DSDA UE may dynamically split its hardware capability between its two subscriptions based on past measurement reports associated with certain geographic locations in memory of the DSDA UE. In some cases, the DSDA UE may detect that one of its network subscriptions is in an idle mode and the DSDA UE may dynamically allocate hardware capability from the network subscription that is in the idle mode to its active network subscription.

A DSDA UE may dynamically determine that the hardware capability of a first network subscription is better suited to perform one or more network measurements assigned to a second network subscription of the UE than the hardware capability of the second network subscription. The UE may make this determination based on, for example a bandwidth, band, or operating frequency of the first network subscription and the second network subscription. The UE may then perform the one or more network measurements assigned to the second network subscription via the first network subscription. The UE may then transmit the measurement report for the measurements to the network via the second network subscription that was assigned the measurements. In some examples, the first network subscription and the second network subscription may be associated with different network service providers.

A method for wireless communications at a UE is described. The method may include receiving, from a first cell, signaling indicating for the UE to perform a first set of one or more measurements on a first wireless link between the UE and the first cell, where the one or more measurements are configured exclusively for a first network subscription of the UE, performing the first set of one or more measurements on the first wireless link using a second network subscription of the UE, and transmitting, using the first network subscription, a first measurement report based on performing the first set of one or more measurements via the second network subscription.

An apparatus for wireless communications at a UE is described. The apparatus may include a processor, a transceiver coupled with the processor, and memory coupled with the processor. The memory and the processor may be configured to cause the apparatus to receive, from a first cell, signaling indicating for the UE to perform a first set of one or more measurements on a first wireless link between the UE and the first cell, where the one or more measurements are configured exclusively for a first network subscription of the UE, perform the first set of one or more measurements on the first wireless link using a second network subscription of the UE, and transmit, using the first network subscription, a first measurement report based on performing the first set of one or more measurements via the second network subscription.

Another apparatus for wireless communications at a UE is described. The apparatus may include means for receiving, from a first cell, signaling indicating for the UE to perform a first set of one or more measurements on a first wireless link between the UE and the first cell, where the one or more measurements are configured exclusively for a first network subscription of the UE, means for performing the first set of one or more measurements on the first wireless link using a second network subscription of the UE, and means for transmitting, using the first network subscription, a first measurement report based on performing the first set of one or more measurements via the second network subscription.

A non-transitory computer-readable medium storing code for wireless communications at a UE is described. The code may include instructions executable by a processor to receive, from a first cell, signaling indicating for the UE to perform a first set of one or more measurements on a first wireless link between the UE and the first cell, where the one or more measurements are configured exclusively for a first network subscription of the UE, perform the first set of one or more measurements on the first wireless link using a second network subscription of the UE, and transmit, using the first network subscription, a first measurement report based on performing the first set of one or more measurements via the second network subscription.

Some examples of the method, apparatuses, and non-transitory computer-readable medium described herein may further include operations, features, means, or instructions for storing the first measurement report in a memory of the UE in association with the first network subscription.

Some examples of the method, apparatuses, and non-transitory computer-readable medium described herein may further include operations, features, means, or instructions for storing a geographic location in the memory of the UE in association with the first measurement report.

Some examples of the method, apparatuses, and non-transitory computer-readable medium described herein may further include operations, features, means, or instructions for identifying that one or more hardware capabilities of the UE may be associated with the second network subscription, where performing the first set of one or more measurements using the second network subscription including performing the first set of one or more measurements using the one or more hardware capabilities of the UE associated with the second network subscription.

In some examples of the method, apparatuses, and non-transitory computer-readable medium described herein, the one or more hardware capabilities of the UE include a supported bandwidth, a supported multiple-input multiple-output rank, a supported quantity of one or more component carriers, a supported quantity of one or more layers per configured component carrier, or any combination thereof.

Some examples of the method, apparatuses, and non-transitory computer-readable medium described herein may further include operations, features, means, or instructions for identifying an allocation of a hardware capability of the UE, where the identified allocation includes a first subset of the hardware capability of the UE being associated with the first network subscription and a second subset of the hardware capability of the UE being associated with the second network subscription and determining to perform the first set of one or more measurements using the second network subscription based on the identified allocation.

In some examples of the method, apparatuses, and non-transitory computer-readable medium described herein, the first network subscription may be associated with a first subscriber identification module card inserted into a first card slot of the UE and the second network subscription may be associated with a second subscriber identification module card inserted into a second card slot of the UE.

In some examples of the method, apparatuses, and non-transitory computer-readable medium described herein, the allocation may be based on the first subscriber identification module card being inserted into the first card slot and the second subscriber identification module card being inserted into the second card slot.

Some examples of the method, apparatuses, and non-transitory computer-readable medium described herein may further include operations, features, means, or instructions for identifying that the first network subscription may be in an idle mode, where performing the first set of one or more measurements via the second network subscription may be based on the first network subscription being in the idle mode.

Some examples of the method, apparatuses, and non-transitory computer-readable medium described herein may further include operations, features, means, or instructions for identifying a dynamic configuration of a hardware capability associated with the first network subscription and the second network subscription, where performing the first set of one or more measurements via the second network subscription may be based on the dynamic configuration of the hardware capability.

In some examples of the method, apparatuses, and non-transitory computer-readable medium described herein, the first network subscription may be associated with a first network operator and the second network subscription may be associated with a second network operator different from the first network operator.

Some examples of the method, apparatuses, and non-transitory computer-readable medium described herein may further include operations, features, means, or instructions for receiving, from a second cell, second signaling indicating for the UE to perform a second set of one or more measurements on a second wireless link between the UE and the second cell, where the one or more measurements may be configured exclusively for the second network subscription, performing the second set of one or more measurements on the second wireless link using the first network subscription, and transmitting, using the second network subscription, a second measurement report based on performing the second set of one or more measurements via the second network subscription.

BRIEF DESCRIPTION OF THE DRAWINGS

FIGS. 10 through 14 show flowcharts illustrating methods that support hardware capability reallocation for a UE and/or and cross-subscription measurements for a UE in accordance with aspects of the present disclosure.

DETAILED DESCRIPTION

Figure 1:
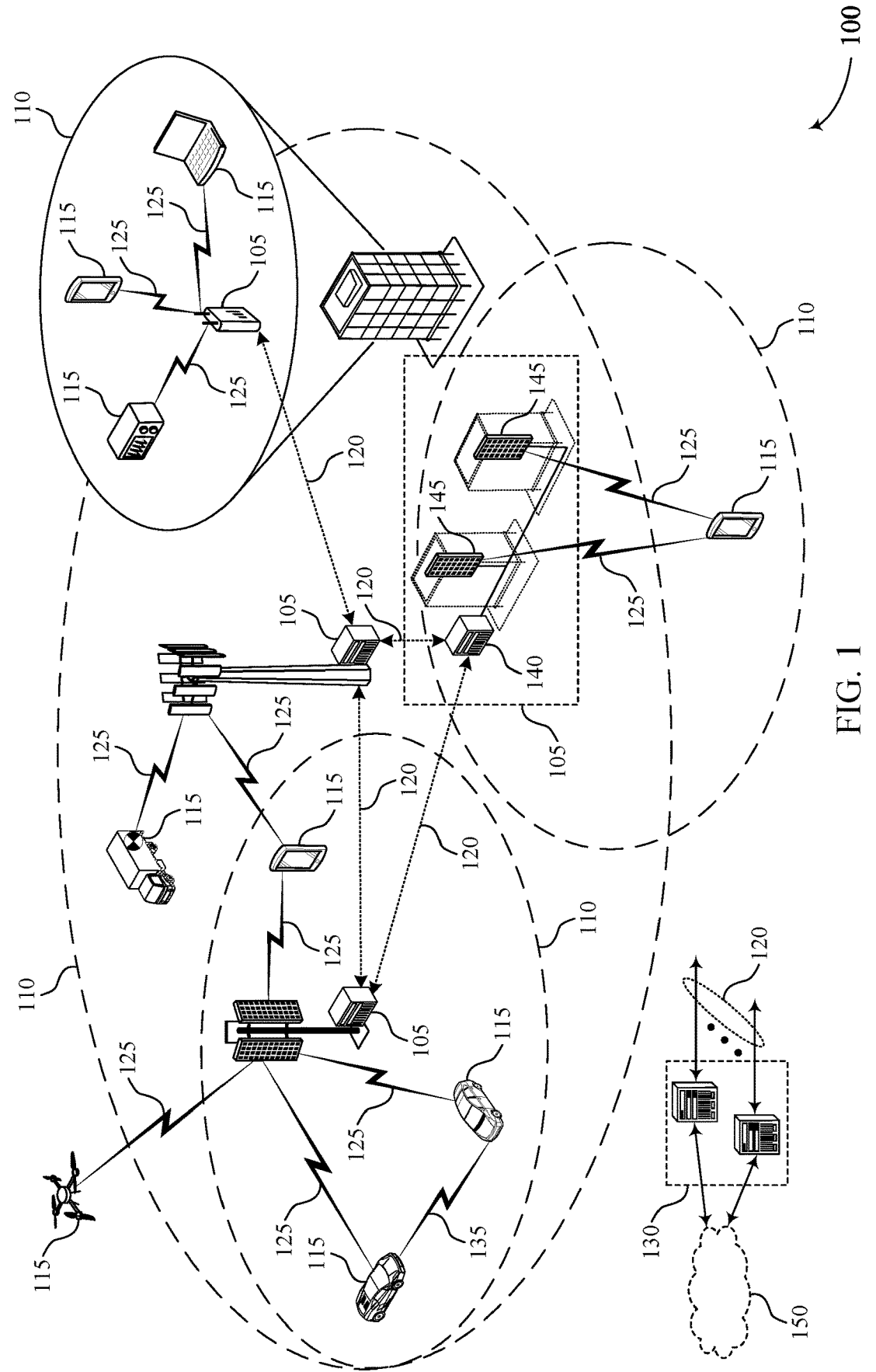
FIG. 1 illustrates an example of a wireless communications system that supports hardware capability reallocation for a user equipment (UE) and/or cross-subscription measurements for a UE in accordance with aspects of the present disclosure.

In some wireless communications systems, a user equipment (UE) may be capable of operating or otherwise supporting multiple network subscriptions such that the UE may communicate with multiple networks or service providers. For example, the UE may be an example of a device that is capable of supporting multiple subscriber identity module (SIM) cards (e.g., the UE may be an example of a multi-SIM device) and the UE may use each SIM card to establish and support communication with a different service provider. In some examples, for instance, the UE may feature a first network subscription to a first service provider via a first SIM card and may feature a second network subscription to a second service provider via a second SIM card. As such, the UE may communicate with the first service provider using the first network subscription and may communicate with the second service provider using the second network subscription. In some deployments, such as in dual SIM dual active (DSDA) deployments, the UE may communicate with the first service provider via the first network subscription and the second service provider via the second network subscription when both the first network subscription and the second network subscription are in connected modes.

In some DSDA deployments the total hardware capability of the UE (e.g., baseband-like tile allocation, radio frequency (RF) capability, or the like) may be statically split into two portions and each network subscription may be associated with one of the two portions. In some DSDA deployments, one network subscription may be associated with a higher capability portion of the hardware and the other network subscription may be associated with a lower capability portion of the hardware. The higher capability portion may be associated with a SIM card inserted into a SIM card slot that is associated with a higher priority over another physical SIM card slot. Network conditions for the two subscriptions may change over time, for example, as a result of the UE moving in space or as a result of changing traffic conditions. Therefore, a static allocation of hardware capability between the two network subscriptions may be inefficient as network conditions change.

UEs with DSDA deployments may perform measurements of available cells for each network subscription as part of UE capability exchange and UE capability response procedures with the networks associated with each network subscription.

Some examples of such procedures may include receiving a measurement object message from a first cell via a first network subscription to perform one or more measurements on a wireless link between a UE and the first cell. The UE may then perform the one or more measurements and report information to the network associated with the first network subscription. In some examples, the UE may receive measurement objects and transmit measurement reports at regular intervals (e.g., within ten to twenty seconds). In some cases, a UE may not store the measurement reports that it transmits locally after transmission. However, as described herein, some UEs may store the measurement reports that it previously performed and may associate the measurement reports in memory with a given cell or geographic location.

In some examples (e.g., to prevent an inefficient allocation of hardware resources between network subscriptions), a DSDA UE may dynamically allocate its hardware capability to the two network subscriptions based on current or predicted conditions. For example, a DSDA UE may dynamically allocate its hardware capability to account for recently measured network conditions associated with either or both of the first network subscription and the second network subscription. In some cases, a DSDA UE may determine, based on one or more measurement reports, that a first network that it is communicating with on a lower priority network subscription has a higher capability than a second network subscription that it is communicating with on a higher priority subscription. The DSDA UE may dynamically allocate hardware capability from the higher priority subscription to the lower priority subscription to take advantage of the determined higher capability conditions of the first network. In some examples, the DSDA UE may dynamically split its hardware capability between its two subscriptions based on past measurement reports associated with certain geographic locations in memory of the DSDA UE.

In some examples, the DSDA UE may predict future network conditions based on past measurement reports and then dynamically allocate the DSDA UE's hardware capability between its two subscriptions based on the predicted network conditions. For example, some UEs include sufficient memory and processing power to run machine learning algorithms. Some UEs may use data collection and/or mining to predict a future location or mobility using machine learning or artificial intelligence techniques. For example, a UE may use a current location and destination in a navigation application to predict a mobility and upcoming cells for the network subscriptions, and the UE may also generate a confidence factor associated with its predictions based on past measurement reports.

In some examples, the UE may use additional data such as its current location, the time of day (e.g., in association with common past routes at the time of day or scheduled routes at the time of day), user calendar or other user data, past movements, frequently visited routes (e.g., home or office), encountered cells on past routes or measurement reports on past routes, or past user behavior or activities to predict its future location and/or mobility. The UE may use this information to run machine learning algorithms based on deep neural networks or support-vector machine algorithms in order to predict a future location and/or mobility. In some examples, the UE may also predict information such as a list of probable cells, the operating band of the probable cells, the multiple-input multiple-output (MIMO) rank supported by the probable cells, and/or the CA band combination supported based on the band combination with good measurements expected in the predicted mobility route. In some examples, the UE may run the machine learning algorithms for both network subscriptions and evaluate a maximum capability associated with each network subscription (e.g., a maximum capability envelope) and then the UE may dynamically allocate its hardware capability between the two network subscriptions based on the results of the machine learning algorithm (e.g., based on a predicted mobility route and the calculated maximum envelope for each network subscription). Additionally or alternatively to other hardware capabilities that may be dynamically allocated between the two network subscriptions disclosed elsewhere herein, hardware capabilities that may be symmetrically or asymmetrically allocated between the two network subscriptions can include any capability that the UE can report to a network (e.g., via UE Capability Information message)), including but not limited to, for example, supported Radio Access Technologies (RATs) or Inter Radio Access Technologies (IRATs), supported bands on various RATs, UE Category (e.g., supported modulation schemes, maximum number of bits that can be received during a transmission time interval (TTI), number of spatial multiplexing layers supported, MIMO layers supported, etc.), carrier aggregation-related capabilities, bands supporting 256QAM (downlink) and 64QAM (uplink), and/or the like. A hardware capability can refer to hardware that supports a UE capability. As such, hardware capability allocation can refer to the allocation of hardware supporting a given capability to one or another network subscription. In some examples, the UE capability allocation may be updated using a technique such as sending a tracking area update and then updating the capability allocation as part of the UE capability inquiry.

In some examples, the UE may predict more than one cell, each having a different configuration, different capability rank, or both. The UE may associate a confidence metric with each predicted cell and determine a hardware capability allocation based on the cells with a higher confidence metric. In some examples, the UE may report measurement information associated with one or more cells to a central server. In some examples, the UE 415 may receive information relating to one or more cells from the central server, for example information based on past measurement reports from the UE or other UEs from other users. For example, a central server may store crowdsourced data with regard to one or more cells. The UE may use the data from the central server to configure the second allocation. For example, the UE may determine the second allocation based on a machine learning algorithm based on the received data from the central server.

In some cases, a DSDA UE may determine that one of its network subscriptions is in an idle mode and may dynamically allocate hardware capability from the network subscription that is in the idle mode to its active network subscription. In some examples, the UE may determine that a data requirement from the application layer of an active network subscription is higher than what the hardware capability assigned to the active network subscription (e.g., a digital data service subscription) can provide. In such examples, the UE may allocate hardware capability from the network subscription in the idle mode to the network subscription that is in the active mode. In some examples, once either the data requirement from the application layer of the active network subscription is reduced, or once the other network subscription returns to an active state from the idle state, the UE may return to a default hardware capability allocation between the two subscriptions.

In some cases, each network subscription in a DSDA UE receives assigned measurements, for example via measurement objects as explained above. However, based on the hardware capabilities assigned to each network subscription of the UE, one network subscription may be better equipped to perform the measurements assigned to the other network subscription.

In some examples of techniques described herein (e.g., to ensure that the better equipped subscription performs a given measurement assignment), a DSDA UE may dynamically determine that a first network subscription's hardware capability is better suited to perform one or more network measurements assigned to a second network subscription of the UE. The UE may make this determination based on, for example a bandwidth, band, radio frequency support, radio frequency front end capability, or operating frequency of the first network subscription. For example, performing measurements on a certain cell (e.g., band or frequency) may occur in a gapless manner on one network subscription as compared to the other network subscription based on the operating band and the associated capability. That is, performing measurements on the cell using the assigning network subscription may result in measurement gaps, while the same measurements on the cell with the unassigned network subscription may not result in such gaps. The UE may perform the one or more network measurements assigned to the second network subscription via the first network subscription. The UE may then report the measurement object to the network via the second network subscription.

tion that was assigned the measurement object. Accordingly, while each network subscription of the DSDA UE receives its own measurement object list and configuration independently, the more suitable network subscription (and the associated software-defined radio and radio frequency front end) may be chosen to perform the assigned measurements dynamically in order to optimize the efficiency of the measurements. In some examples, the first network subscription and the second network subscription may be associated with different network service providers.

Aspects of the disclosure are initially described in the context of wireless communications systems. Aspects of the disclosure are also described in the context of a block diagram, a subsystem diagram, and process flows. Aspects of the disclosure are further illustrated by and described with reference to apparatus diagrams, system diagrams, and flowcharts that relate to hardware capability reallocation for a UE.

FIG. 1 illustrates an example of a wireless communications system 100 that supports hardware capability reallocation for a UE in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may be configured with or otherwise support multiple network subscriptions such that the UE 115 may communicate with multiple networks or service providers. For example, the UE 115 may be an example of a device that is capable of supporting multiple SIM cards (e.g., the UE 115 may be an example of a multi-SIM device) and the UE 115 may use each SIM card to establish and support communication with a different service provider. The UE 115 may be configured in a DSDA deployment. A UE 115 configured with a DSDA deployment may communicate with a first service provider (e.g., via a first base station 105) via a first network subscription and a second service provider (e.g., via a second base station) via a second network subscription when both the first network subscription and the second network subscription are in connected modes. A DSDA UE 115 may dynamically allocate its hardware capability to its two network subscriptions based on current or predicted conditions. For example, a DSDA UE 115 may dynamically allocate its hardware capability to account for recently measured network conditions associated with either or both of the first network subscription and the second network subscription (e.g., measurements of wireless links between the UE 115 and one or more base stations 105).

In some cases, a DSDA UE 115 may determine, based on one or more measurement reports, that a first network that it is communicating with on a lower priority network subscription has a higher communications capability than a second network subscription that it is communicating with on a higher priority subscription. The DSDA UE 115 may dynamically allocate hardware capability from the higher priority subscription to the lower priority subscription to take advantage of the determined higher capability conditions of the first network. In some examples, the DSDA UE 115 may predict future network conditions based on past measurement reports and then dynamically allocate the hardware capability of the DSDA UE 115 between the two subscriptions based on the predicted network conditions. In some examples, the DSDA UE 115 may dynamically split its hardware capability between its two subscriptions based on past measurement reports associated with certain geographic locations in memory of the DSDA UE 115. In some cases, a DSDA UE 115 may detect that one of its network subscriptions is in an idle mode and may dynamically allocate hardware capability from the network subscription that is in the idle mode to its active network subscription.

The DSDA UE 115 may dynamically determine that one of its network subscriptions has a hardware capability that is better suited to perform one or more network measurements assigned to its other network subscription. For example, a cell associated with a first base station 105 may transmit signaling (e.g., a measurement object) indicating for the UE 115 to perform a set of one or more measurements on a wireless link between the UE 115 and the cell using a first network subscription. The UE 115 may determine that the portion of its hardware capability assigned to its second network subscription is better suited to perform the measurement(s) indicated by the signaling rather than the assigned first network subscription. The UE 115 may make this determination based on, for example a bandwidth, band, or operating frequency of the first network subscription. The UE 115 may then perform the one or more network measurements assigned to its first network subscription via the second network subscription. The UE 115 may then transmit the measurement report to the network (e.g., to the first base station 105) via the first network subscription that was assigned the measurement object. In some examples, the first network subscription and the second network subscription may be associated with different network service providers.

Figure 2:
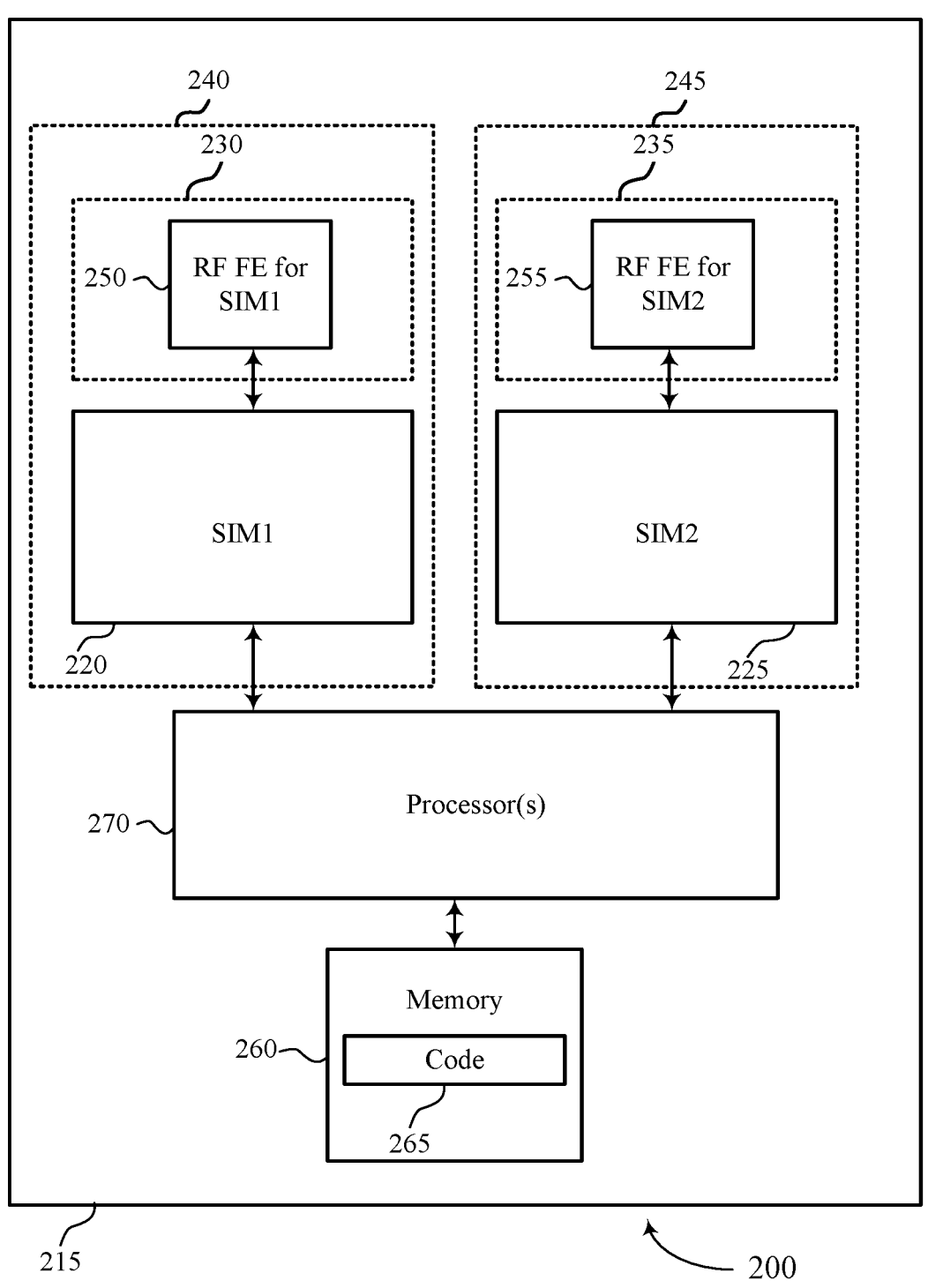
FIG. 2 illustrates an example of a block diagram that supports hardware capability reallocation for a UE in accordance with aspects of the present disclosure.

FIG. 2 illustrates an example of a block diagram 200 that supports hardware capability reallocation for a UE in accordance with aspects of the present disclosure. A UE 215 may include a first SIM card associated with a first network subscription and a second SIM card associated with a second network subscription. In some examples the first SIM card 220 may be inserted into a first SIM card slot of the UE 215 and the second SIM card 225 may be inserted into a second SIM card slot of the UE 215. The first SIM card 220 may be associated with a first portion 230 of the hardware capability of the UE 215, and the second SIM card may be associated with a second portion 235 of the hardware capability of the UE 215. For example, first portion 230 of the hardware capability associated with the first SIM card 220 may be associated with radio frequency front end circuitry 250 and the second portion 235 of the hardware capability associated with the second SIM card 225 may be associated with radio frequency front end circuitry 255. Each portion of hardware capability may include tile allocation (e.g., baseband-like tile allocation), radio frequency capabilities, or the like, among other examples. In some examples, each SIM card slot of the UE 215 may be associated with a default portion (e.g., portions 230 or 235) of the hardware capability of the UE 215. In some examples, the first portion 230 and the second portion 235 cumulatively include the total hardware capability of the UE 215.

The UE 215 may also include memory 260. The memory 260 may include random access memory (RAM) and read-only memory (ROM). The memory 260 may store computer-readable, computer-executable code 265 including instructions that, when executed by the processor(s) 270, cause the UE 215 to perform various functions described herein. The code 265 may be stored in a non-transitory computer-readable medium such as system memory or another type of memory. In some cases, the code 265 may not be directly executable by the processor(s) 270 but may cause a computer (e.g., when compiled and executed) to perform functions described herein.

The processor(s) 270 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 270 may be configured to operate a memory array using a memory controller. In some other cases, a memory controller may be integrated into the processor 270. The processor 270 may be configured to execute computer-readable instructions stored in a memory (e.g., the memory 270) to cause the UE 215 to perform various functions (e.g., functions or tasks supporting hardware capability reallocation for a UE). For example, the UE 215 or a component of the UE 215 may include a processor 270 and memory 260 coupled to the processor 270, the processor 270 and memory 260 configured to perform various functions described herein. For example, the processor 270 may support wireless communications via a first network subscription associated with the first SIM card 220 and the first portion 230 of the hardware capability and via the second subscription associated with the second SIM card 225 and the second portion 235 of the hardware capability.

In some examples, the first subscription (e.g., corresponding to the first in the first SIM card slot) may be considered a higher capability or priority network subscription 240 and the second subscription (e.g., corresponding to the second SIM card 225 in second SIM card slot) may be considered a lower capability or priority network subscription 245.

For example, the high capability network subscription 240 may be associated with more layers per component carrier (CC) in various modes. For example, the high capability network subscription 240 may be associated with 4 layers per CC in a downlink TDD mode while the low capability network subscription may be associated with 2 layers per CC for same downlink TDD mode. Accordingly, the UE 215 may be associated with 6 layers per CC in that downlink TDD mode. It is to be understood that these and other specific numeric examples provided herein are solely for the sake of illustrative clarity and are not limiting, of the claims or otherwise.

In some aspects, the UE 215 may dynamically allocate hardware capability from one of its network subscriptions to the other. For example, the UE 215 may dynamically allocate a layer from the high capability network subscription 240 to the low capability network subscription 245, such that the high capability network subscription 240 may be associated with 3 layers per component carrier in that downlink TDD mode while the low capability network subscription 245 may be associated with 3 layers per component carrier (CC) in in the same downlink TDD mode. The UE 215 may similarly dynamically allocate other hardware capabilities. For example, the UE 215 may dynamically allocate a number of layers per CC in a uplink or downlink TDD or FDD mode, a total bandwidth per uplink or down-link TDD or FDD mode, or a number of CCs. In some examples, the dynamic allocation of layers from one network subscription to another may include switching which network subscription is associated with the higher capacity (e.g., associating the lower capability network subscription with the higher capacity hardware capabilities, and the higher capability network subscription with the lower capacity hardware capabilities).

Figure 3:
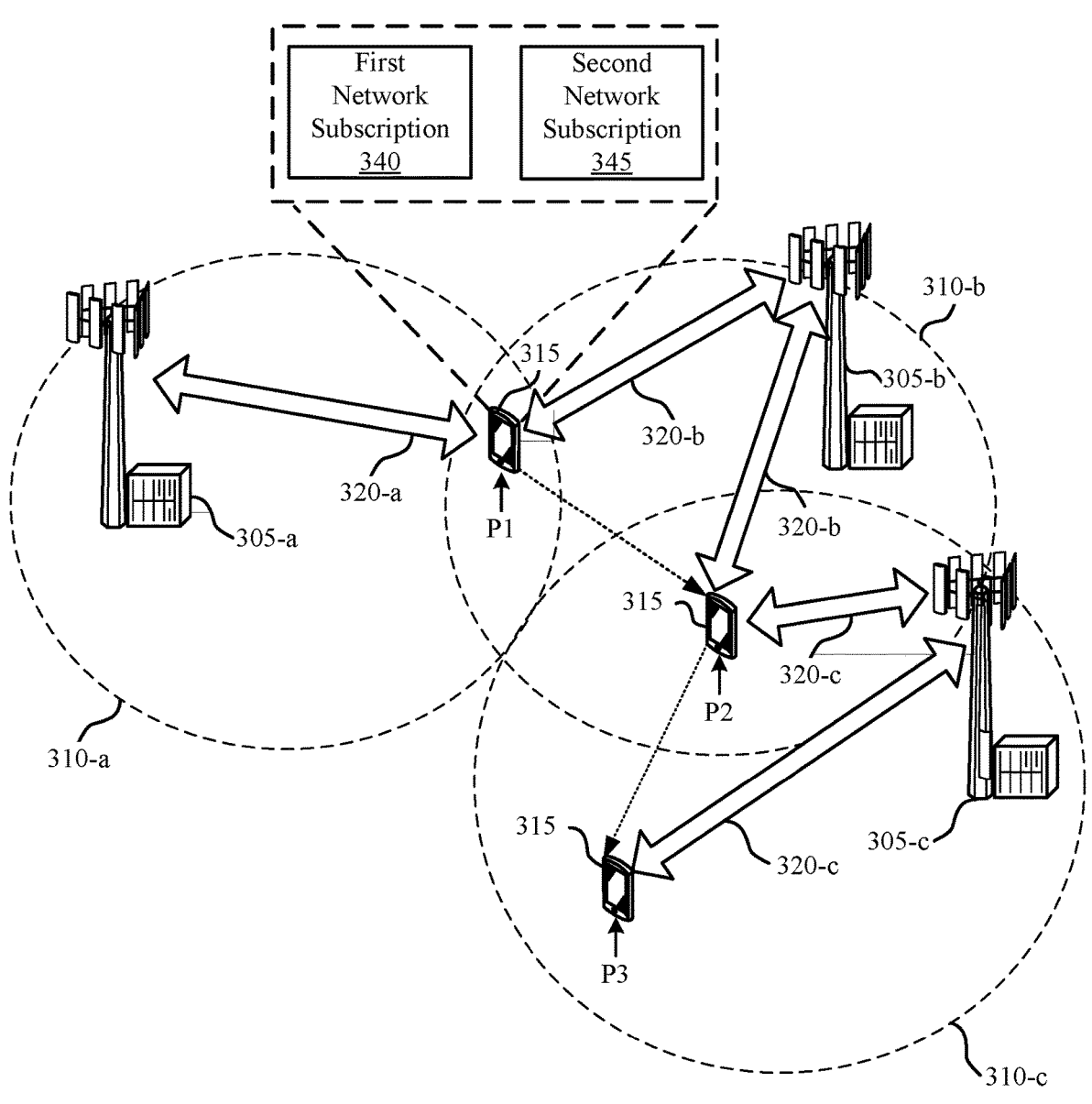
FIG. 3 illustrates an example of a wireless communications system that supports hardware capability reallocation for a UE and/or cross-subscription measurements for a UE in accordance with aspects of the present disclosure.

FIG. 3 illustrates an example of a wireless communications system 300 that supports hardware capability reallocation for a UE and/or cross-subscription measurements for a UE in accordance with aspects of the present disclosure. In some examples, wireless communications system 300 may implement aspects of wireless communications system 100. Wireless communications system 300 may include a UE 315, a first base station **305-*a*, a second base station 305-*b*, and a third base station 305-*c*, which may be examples of UEs 115 and base stations 105, as described with reference to FIG. 1**.

The first base station **305-*a* may support communications via a first cell within a first geographic coverage area 310-*a*, the second base station 305-*b* may support communications via a second cell within a second geographic coverage area 310-*b*, and the third base station 305-*c* may support communications via a third cell within a third geographic coverage area 310-*c***.

In some examples, the UE 315 may be a DSDA UE 315 which includes a first network subscription 340 and a second network subscription 345. In some examples, the first network subscription 340 may be a higher capability network subscription and the second network subscription 345 may be a lower capability network subscription, for example as described with respect to FIG. 2. As shown, at geographic position P1, the UE 315 may communicate with the first base station **305-*a* via its first network subscription 340 using a communication link 320-*a*. At position P1, the UE 315 may also communicate with the second base station 305-*b* via its second network subscription 345 using a communication link 320-*b*. In some examples, the UE 315 may communicate with the same base station (e.g., base station 305-*a*) via both of its network subscriptions. At position P1, the first network subscription 340 may be associated with a first portion of the total hardware capabilities of the UE 315 and the second network subscription 345 may be associated with a second portion of the total hardware capabilities of the UE 315**.

In some examples, as described in greater detail with reference to FIG. 5, a UE 315 may perform one or more measurements using one or multiple network subscriptions. For example, at position P1, the UE 315 may perform measurements of available cells for each network subscription as part of UE capability exchange and UE capability response procedures with the base stations **305-*a* and 305-*b*. In some examples, the base station 305-*a* may send signaling (e.g., a measurement object) indicating for the UE 315 to perform a set of one or more measurements on the wireless link 320-*a* between the UE 315 and the base station 305-*a*. In some examples, the one or more measurements may be configured exclusively for the first network subscription 340 of the UE 315. The UE 315 may determine that the hardware capability associated with the second network subscription 345 is better suited to perform the one or more measurements indicated by the signaling received from the base station 305**-*a*. The UE 315 may make this determination based on, for example a bandwidth, band, or operating frequency of the first network subscription and the second network subscription. The UE 315 may then perform the one of more measurements using the second network subscription 345, and then transmit the measurement report indicating the one or more measurements of the wireless link 320-*a* to the base station 305-*a* via the first network subscription 340.

In some examples, as described with reference to FIG. 3 and FIG. 4, the UE 315 may perform hardware capability splitting based on mobility predictions, past measurement reports, or the like. For example, the UE 315 may save measurement reports of the wireless links (e.g., wireless links 320-*a* and/or 320-*b*) locally in memory of the UE 315. The UE 315 may include sufficient memory to store historical data and measurement reports, processing power for performing machine learning or applying smart algorithms, and advanced sensors. Such a UE 315 may be capable of performing data mining and running machine learning and artificial intelligence techniques to predict its future position or mobility path as well as network conditions associated with a predicted future position and/or mobility path. Thus, as described herein, a UE 315 may use machine learning and artificial intelligence based algorithms to predict user mobility using a current location and destination in Navigation Applications, a current location, time of day (e.g., common past routes at the time of day or scheduled routes at the time of day), user behavior, user appointments, calendars, and other activities, or any combination thereof.

A user may move from geographic position P1 to geographic position P2. At position P2, the UE 315 may communicate with the second base station 305-*b* via the second network subscription 345 using a communication link 320-*b* and with a third base station 305-*c* via the first network subscription 340 using a communication link 320-*c*. Conditions of the wireless links 320-*b* and 320-*c* may at position P2 be different from the conditions of the wireless links 320-*a* and 320-*b* at position P1. The UE 315 may dynamically allocate its hardware capability between its two network subscriptions (340 and 345) based on current (e.g., measured) or predicted network conditions at position P2.

In some examples, the UE 315 may predict that the UE 315 will subsequently be at position P2, and the UE 315 may dynamically allocate its hardware capability between its two network subscriptions (340 and 345) based on predicted network conditions at position P2. For example, the UE 315 may predict that it will be at position P2 based on, its current location (e.g., that it is at position P1) and prior route data (e.g., having previously traveled from position P1 to P2), the time of day (e.g., at a certain time of day the UE 315 may habitually travel to work or another destination along the route between P1 and P2), the user's past behavior, patterns, or activities, appointments in the user's calendar, a current route in a navigation application, or frequent routes and cells or base stations 305 encountered on those routes and/or past measurement reports. The UE 315 may use this data to run a machine learning algorithm in order to predict the future position or mobility of the UE 315 (e.g., that the UE 315 will be at position P2).

In some cases, the UE 315 may predict network conditions at position P2 using a machine learning algorithm, for example based on past measurement reports at or near position P2. For instance, the UE may determine a list of probable cells on the route between position P1 and P2 (e.g., 310-*a*, 310-*b*, and 310-*c*), the operating bands of the cells, the MIMO rank supported by the cells, the CA band combination supported or possible based on the based on the band combination with good measurements expected in the predicted mobility route. In some examples, the UE 315 may generate a confidence factor associated with its predictions based on past measurement reports. The UE 315 may then evaluate a maximum possible hardware capability envelope of its two network subscriptions along the predicted mobility route. In some examples, the UE may predict more than one cell, each having a different configuration, different capability rank, or both. The UE may associate a confidence metric with each predicted cell and determine a capability allocation based on the cells with a higher confidence metric.

Based on the predicted or current network conditions along the predicted mobility route, for example at position P2, the UE 315 may dynamically allocate its hardware capability between its two network subscriptions (340 and 345) based on current or predicted network conditions at position P2. For example, if the UE 315 predicts or determines (e.g., based on one or more current measurements or stored past measurements) that communication link 320-*c* has a lower maximum capability envelope than communication link 320-*b*, the UE 315 may dynamically allocate resources from the first network subscription 340 to the second network subscription 345.

In some examples, the UE 315 may perform evaluations described herein (e.g., determining or predicting a path, route, or predicted location of the UE 315 based on past measurements, machine learning or artificial intelligence algorithms, user input activity, application, or the like) for both supported network subscriptions. Based on such evaluations, the UE 315 may determine a threshold (e.g., maximum) envelope possible for each of the network subscriptions along a predicted mobility route. The total hardware capability of the UE 315 may be split dynamically based on this determination (e.g., of the threshold envelope possible for each of the network subscriptions).

In some examples, the UE 315 may dynamically allocate hardware capability across one or more network subscriptions based on current application and usage of the multiple network subscriptions. In some cases, the UE 315 may not utilize both network subscriptions in connected mode simultaneously, at all times. Instead, sometimes one of the two network subscriptions may operate in a connected mode for active data sessions, while the other network subscription may be in an idle mode. For instance, as shown in FIG. 3, as the UE 315 may move from geographic position P2 to geographic position P3, the UE 315 may move out of the second geographic coverage area 310-*b* of the base station 305-*b*. At position P3, the second subscription 345 may be in an idle mode. The UE 315 may then dynamically allocate hardware capability from the second network subscription 345 in the idle mode to the first network subscription 340 via which the UE 315 may continue to communicate with the base station 305-*c* using communication link 320-*c*.

In some examples, the UE 315 may determine that a data requirement from the application layer of the first network subscription 340 is higher than what the hardware capability assigned to the first network subscription 340 can provide. In such examples, the UE 315 may allocate hardware capability from the second network subscription 345 (e.g., in the idle mode) to the first network subscription 340 that is in the active mode. In some examples, the UE 315 may provide the second subscription 345 that is in the idle mode sufficient hardware capability to support a threshold amount of set of operations (e.g., page decode operations, mobile terminated voice call operations, or the like). In some examples, once the data requirement from the application layer of the active first network subscription 340 is reduced, the UE 315 may return to a default hardware capability allocation between the two subscriptions. In some examples, once the second network subscription is no longer in an idle mode, for example once the UE 315 moves into the geographic coverage area 310-*b* and the UE 315 establishes communications with the base station 305-*b* via the second network subscription 345, the UE 315 may reallocate resources back to the second network subscription 345.

Figure 4:
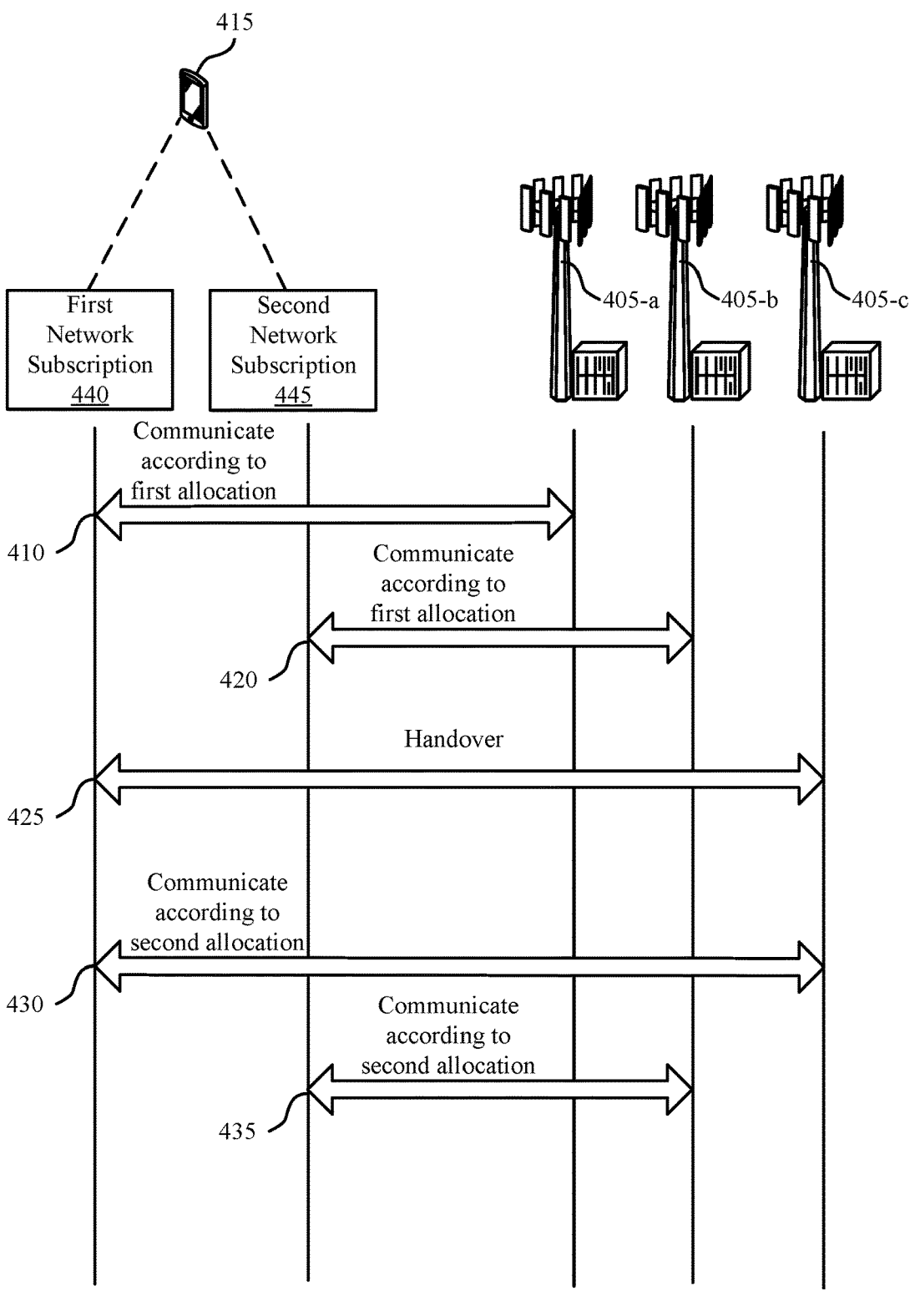
FIG. 4 illustrates an example of a process flow that supports hardware capability reallocation for a UE in accordance with aspects of the present disclosure.

FIG. 4 illustrates an example of a process flow 400 that supports hardware capability reallocation for a UE in accordance with aspects of the present disclosure. In some examples, process flow 400 may implement aspects of wireless communication system 100 and/or wireless communications system 300. The process flow 400 may include a UE 415, which may be an example of a UE 115 as described with respect to FIG. 1, a UE 215 as described with respect to FIG. 2, and/or a UE 315 as described with respect to FIG. 3. UE 415 may include first network subscription 440 and a second network subscription 445. Process flow 400 may also include base stations 405-*a*, 405-*b*, and 405-*c*, which may be examples of base stations 105 as described with respect to FIG. 1 and/or base stations 305-*a*, 305-*b*, and 305-*c* as described with respect to FIG. 3. Base stations 405-*a*, 405-*b*, and 405-*c* may be examples of three different cells. UE 415 may move geographically between coverage areas of base stations 405-*a*, 405-*b*, and 405-*c*.

At 410, the UE 415 may communicate with the first base station 405-*a* of a first cell via the first network subscription 440 according to a first allocation of the hardware capability of the UE 415. For example, in the first allocation, the first network subscription 440 may be associated with a first subset of the total hardware capability of the UE 415. In some examples, the UE 415 may report data associated with the first subset to the first base station 405-*a* via the first network subscription 440. In some examples, the first network subscription 440 is associated with a first subscriber identification module card inserted into a first card slot of the UE 415.

At 420, the UE 415 may communicate with the second base station 405-*b* of a second cell via the second network subscription 445 according to the first allocation of the hardware capability of the UE 415. For example, in the first allocation, the second network subscription 445 may be associated with a second subset of the total hardware capability of the UE 415. In some examples, the first subset includes more of the hardware capability of the UE 415 than the second subset. In some examples, the first subset and the second subset cumulatively include a total hardware capability of the UE 415. In some examples, the UE 415 may report data associated with the second subset to the second base station 405-*b* via the second network subscription 445. In some examples, the second network subscription 445 is associated with a second subscriber identification module card inserted into a second card slot of the UE 415. In some examples, the first allocation is based at least in part on the first subscriber identification module card being inserted into the first card slot and the second subscriber identification module card being inserted into the second card slot.

At 425, the UE 415 may perform, via the first network subscription 440, a handover procedure from base station 405-*a* of the first cell to base station 405-*c* of a third cell. The handover procedure may be initiated based on the UE 415 transmitting, via the first network subscription 440, a measurement report of base station 105-*c* of the third cell to base station 105-*a* of the first cell. The UE 415 may receive, via the first network subscription 440, a radio resource control reconfiguration message from base station 405-*a* of the first cell, where the radio resource control reconfiguration message includes an indication to handover to base station 405-*c* of the third cell. The UE 415 may transmit, via the first network subscription 440, a radio resource control reconfiguration complete message to base station 405-*c* of the third cell. During the handover procedure, the UE 415 may perform one or more measurements on the wireless link between the UE 415 and the base station 405-*c* via the first network subscription 440. Based on the one or more measurements on the wireless link between UE 415 and the base station 405-*c* via the first network subscription 440 or one or more measurements between the UE 415 and the base station 405-*b* using the second network subscription 445, the UE 415 may determine a second allocation of its hardware capability between the first network subscription 440 and the second network subscription 445. In some examples, determining the second allocation of its hardware capability may be based on previous, stored measurements. For example, during a previous time (e.g., while traveling along a same route), the UE 415 may perform and store one or more measurements between the second network subscription 445 and the base station 405-*b*.

At 430, the UE 415 may communicate with the third base station 405-*c* of the third cell via the first network subscription 440 according to the second allocation of the hardware capability of the UE 415. For example, in the second allocation, the first network subscription 440 may be associated with a third subset of the total hardware capability of the UE 415, where the third subset of the total hardware capability of the UE 415 may be different from the first subset of the total hardware capability at 410. In some examples, the fourth subset includes more of the hardware capability of the UE 415 than the third subset. In some examples, the third subset and the fourth subset cumulatively include the total hardware capability of the UE 415.

At 435, the UE 415 may communicate with the second base station 405-*b* of a second cell via the second network subscription 445 according to the second allocation of the hardware capability of the UE 415. For example, in the second allocation, the second network subscription 445 may be associated with a fourth subset of the total hardware capability of the UE 415, where the fourth subset of the total hardware capability of the UE 415 may be different from the second subset of the total hardware capability at 420.

In some examples, the UE 415 may store the second allocation in memory of the UE 415 in association with the current or determined geographic location of the UE. For example, the UE 415 may identify different hardware capability splits or allocations to utilize in different scenarios (e.g., when communicating with different base stations 405, in different geographic locations, or under different channel conditions, or the like). In such examples, the UE 415 may determine that one or more conditions are satisfied (e.g., based on a current or predicted locations, based on one or more current measurements, based on one or more stored measurements, based on one or more machine learning or artificial intelligence algorithms, or the like, as described herein), and may select a stored allocation (e.g., the second allocation) from the memory of the UE 415.

In some examples, the UE 415 may configure the second allocation based on the current or predicted geographic location of the UE 415. For example, the UE 415 may predict that it will be within a geographic coverage area of base station 405-*c*. In some examples, the UE may transmit one or more measurement reports to one or more of the base stations 405-*a*, 405-*b*, and/or 405-*c* prior to configuring the second allocation (e.g., while located in a particular geographic coverage area). The UE 415 may configure the second allocation at least based in part on the one or more measurement reports previously transmitted to one or more of the base stations the base stations 405-*a*, 405-*b*, and/or 405-*c*. For instance, while previously located in the geographic coverage area of the base station 405-*c*, the UE 415 may perform one or more measurements and transmit one or more measurement reports to the base station 405-*c*. The UE 415 may store the transmitted measurement reports. If the UE 415 subsequently enters the geographic coverage area of the base station 405-*c*, or predicts that it will soon be entering the geographic coverage area of the base station 405-*c*, then the UE 415 may determine the hardware allocation (e.g., the second allocation) based on the previously stored measurement reports associated with the geographic coverage area of the base station 405-*c*. In some examples, the UE 415 may predict a geographic location based on user data, and then configure the second allocation based at least in part on the predicted geographic location.

In some examples, the UE 415 may predict a mobility path of the UE 415, and then configure the second allocation at least based in part on the predicted mobility path. In some examples, the predicted mobility path is based at least in part on a machine learning algorithm run by the UE 415 and one or more past measurement reports stored in memory of the UE 415. In some examples, the UE 415 may predict more than one cell, each having a different configuration, different capability rank, or both. The UE may associate a confidence metric with each predicted cell and determine a capability allocation based on the cells with a higher confidence metric.

In some examples, the UE 415 may report measurement information associated with one or more cells (e.g., base stations 405-*a*, 405-*b*, or 405-*c*) to a central server. In some examples, the UE 415 may receive information relating to one or more cells (e.g., base stations 405-*a*, 405-*b*, or 405-*c*) from the central server, for example information based on past measurement reports from the UE 415 or other UEs from other users. For example, a central server may store crowdsourced data with regard to one or more cells. The UE 415 may use the data from the central server to configure the second allocation. For example, the UE 415 may determine the second allocation based on a machine learning algorithm based on the received data from the central server.

In some examples, the second allocation is configured based at least in part on at least one of the base stations 405-*a*, 405-*b*, or 405-*c* that the UE 415 is communicating with. In some examples, the second allocation is configured based at least in part on a predicted cell that will be used for subsequent communications. For instance, the UE 415 may predict that it will communicate with base station 405-*c* via its first network subscription 440.

In some examples, one of the network subscriptions may be in an idle mode. For example, the second network subscription 445 may be in an idle mode, and the UE 415 may configure the second allocation at least based in part on determining that the second network subscription is in an idle mode. The UE 415 may revert back to communicating according to the first allocation upon determining that the second network subscription is no longer in an idle mode. In some examples, the fourth subset of hardware capability allocated to the second network subscription 445 while it is in an idle mode is sufficient to support page decode operations and mobile terminated voice call operations, and the third subset of hardware capability assigned to the first network subscription 440 includes the remainder of the hardware capability of the UE 415.

In some examples, the UE 415 may store the second allocation in memory of the UE in association with at least one of the third base station 405-*c* associated with the first network subscription 440 or the second base station 405-*b* associated with the second network subscription 445.

Figure 5:
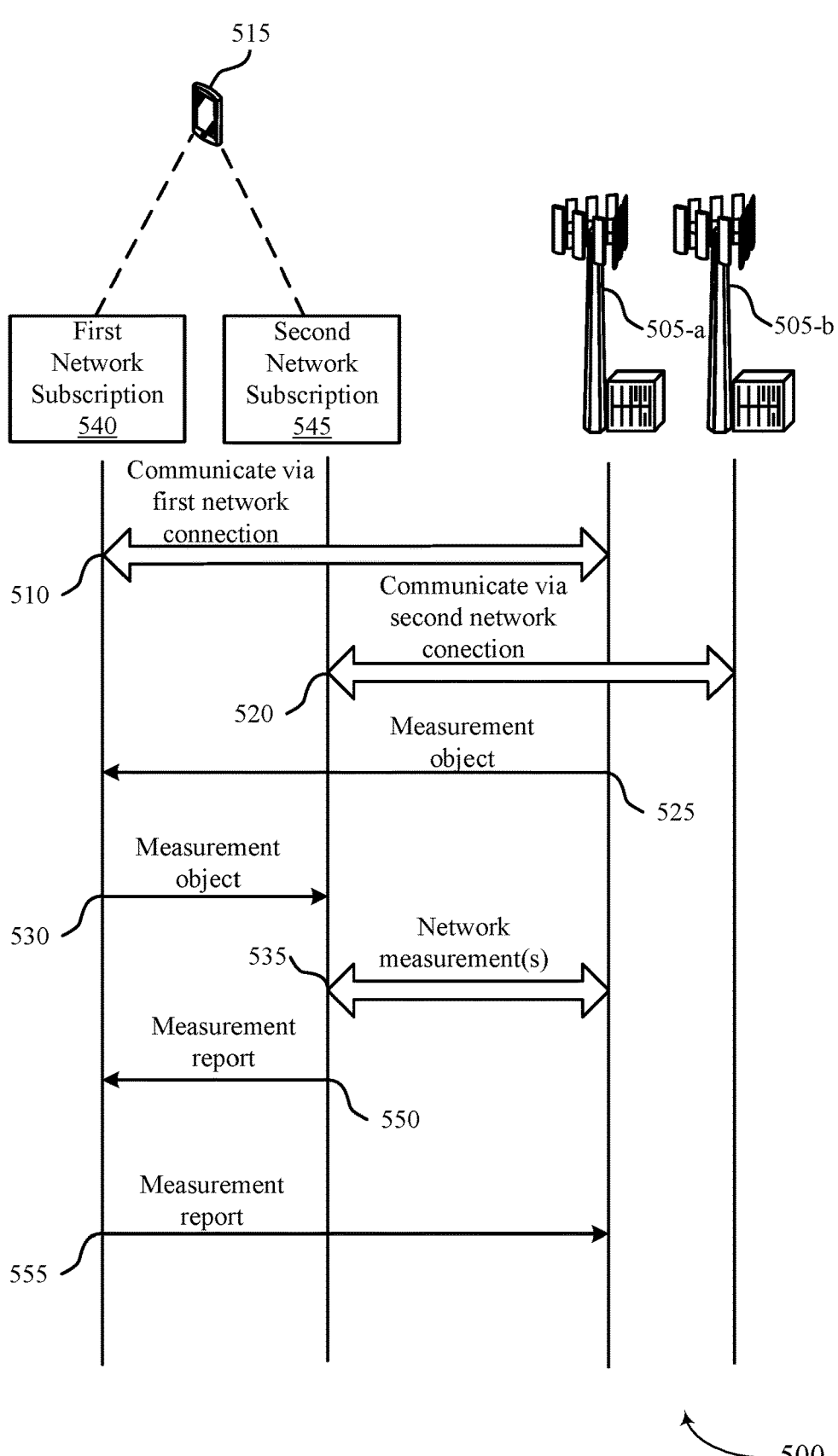
FIG. 5 illustrates an example of a process flow that supports cross-subscription measurements for a UE in accordance with aspects of the present disclosure.

FIG. 5 illustrates an example of a process flow 500 that supports cross-subscription measurements for a UE in accordance with aspects of the present disclosure. In some examples, process flow 500 may implement aspects of wireless communication system 100 and/or wireless communications system 300. The process flow 500 may include a UE 515, which may be an example of a UE 115 as described with respect to FIG. 1, a UE 215 as described with respect to FIG. 2, and/or a UE 315 as described with respect to FIG. 3. UE 515 may include first network subscription 540 and a second network subscription 545. Process flow 500 may also include base stations 505-*a* and 505-*b*, which may be examples of base stations 105 as described with respect to FIG. 1 and/or base stations 305-*a*, 305-*b*, and 305-*c* as described with respect to FIG. 2. Base stations 505-*a* and 505-*b* may be examples of two different cells. UE 515 may move geographically between coverage areas of base stations 505-*a* and 505-*b*.

At 510, the UE 515 may communicate with the first base station 505-*a* of a first cell via the first network subscription 540 according to a first allocation of the hardware capability of the UE 515.

At 520, the UE 515 may communicate with the second base station 505-*b* of a second cell via the second network subscription 545 according to the first allocation of the hardware capability of the UE 515. In some examples, base stations 505-*a* and 505-*b* may be associated with different network operators.

At 525, the UE 515 may receive, via the first network subscription 540, signaling (e.g., a measurement object) indicating for the UE 515 to perform a set of one or more measurements on a wireless link between the UE 515 and the first base station 505-*a*, where the one or more measurements may be configured exclusively for the first network subscription 540 of the UE 515. The UE 515 may determine that the hardware capability associated with the second network subscription 545 is better suited to perform the one or more measurements indicated by the signaling received at 525.

For example, the UE may identify that one or more hardware capabilities of the UE 515 are associated with the second network subscription 545, and the UE 515 may then determine that the one or more hardware capabilities associated with the second network subscription are well-suited to perform the indicated measurement(s). For example, the one or more hardware capabilities may include a supported bandwidth, a supported multiple-input multiple-output rank, a supported quantity of one or more component carriers, a supported quantity of one or more layers per configured component carrier, or any combination thereof.

In some examples, the UE 515 may identify an allocation of a hardware capability of the UE 515, the allocation including a first subset of the hardware capability being associated with the first network subscription 540 and a second subset of the hardware capability of the UE 515 being associated with the second network subscription 545. The UE 515 may then determine to perform the one or more indicated measurements based on the identified allocation of the hardware capability. In some examples, the allocation of hardware capability may be based at least in part on a first subscriber identification module card associated with the first network subscription 540 being inserted into a first card slot and a second subscriber identification module card associated with the second network subscription being inserted into a second card slot.

In some examples, the UE 515 may identify that the first network subscription 540 is in an idle mode. The UE 515 may then determine to perform the indicated measurement(s) via the second network subscription 545 based on the first network subscription 540 being in an idle mode.

In some examples, the UE 515 may identify a dynamic allocation of the hardware capability of the UE 515. The UE 515 may then determine to perform the one or more indicated measurements based on the identified dynamic allocation of the hardware capability.

At 530, the UE 515 may share the signaling (e.g., the measurement object) indicating the set of one or more measurements on the wireless link between the UE 515 and the first base station 505-a with the second network subscription 545.

At 535, the UE 515 may perform the first set of one or more measurements via the second network subscription 545. In some examples, the base station 505-a may be unaware that the UE may perform the first set of one or more measurements via the second network subscription 545 instead of via the first network subscription.

At 550, the UE 515 may share, with the first network subscription 540, the measurement report indicating the one or more measurements of the wireless link between the UE 515 and the first base station 505-a performed by the UE 515 via the second network subscription.

At 555, the UE 515 may transmit, via the first network subscription 540, the measurement report indicating the one or more measurements of the wireless link between the UE 515 and the first base station 505-a.

In some examples, the UE 515 may store the measurement report in memory of the UE in association with the first network subscription 540. In some examples, the UE 515 may store a geographic location in the memory of the UE in association with the measurement report.

In some examples, the UE 515 may additionally receive, from the second base station 505-b, via the second network subscription 545, signaling (e.g., a measurement object) indicating for the UE 515 to perform a set of one or more measurements on a wireless link between the UE 515 and the second base station 505-b, where the one or more measurements may be configured exclusively for the second network subscription 545 of the UE 515. The UE 515 may determine that the hardware capability associated with the first network subscription 540 is better suited to perform the one or more measurements indicated by the signaling received from the second base station 505-b. The UE 515 may then perform the one or more measurements using the first network subscription 540. The UE 515 may then transmit, using the second network subscription 545, the measurement report for the one or more measurements to the second base station 505-b.

Figure 6:
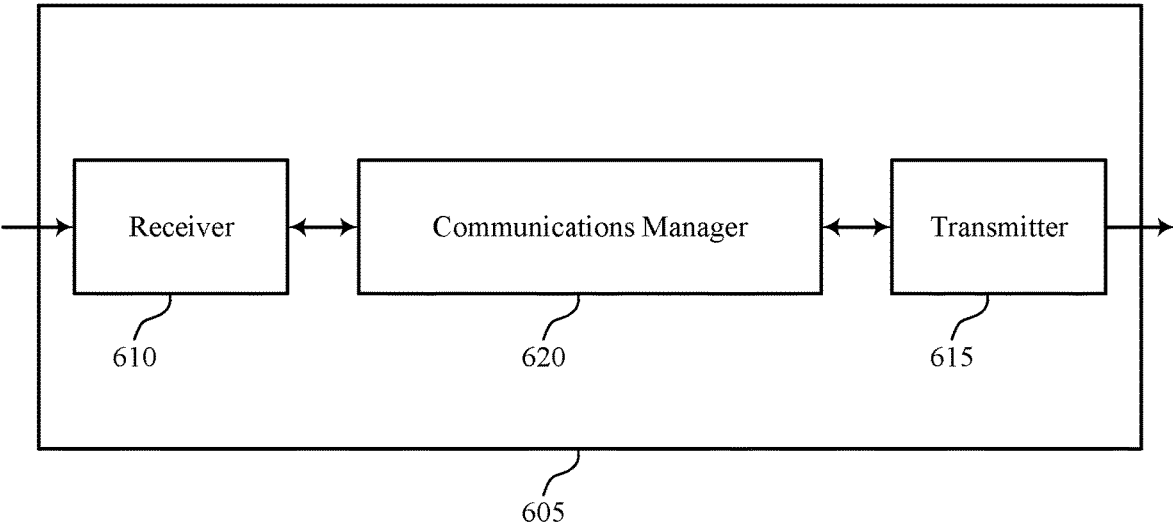
FIGS. 6 and 7 show block diagrams of devices that support hardware capability reallocation for a UE in accordance with aspects of the present disclosure.

FIG. 6 shows a block diagram 600 of a device 605 that supports hardware capability reallocation for a UE in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to hardware capability reallocation for a UE). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to hardware capability reallocation for a UE). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of hardware capability reallocation for a UE as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for communicating via a first network subscription and a second network subscription according to a first allocation of a hardware capability of the UE, where the first allocation includes a first subset of the hardware capability of the UE being associated with the first network subscription and a second subset of the hardware capability of the UE being associated with the second network subscription. The communications manager 620 may be configured as or otherwise support a means for configuring a second allocation of the hardware capability of the UE, where the second allocation includes a third subset of the hardware capability of the UE being associated with the first network subscription and a fourth subset of the hardware capability of the UE being associated with the second network subscription, where the first subset of the hardware capability is different from the third subset of the hardware capability of the UE and the second subset of the hardware capability is different from the fourth subset of the hardware capability of the UE. The communications manager 620 may be configured as or otherwise support a means for communicating via the first network subscription and the second network subscription according to the second allocation of the hardware capability of the UE.

Additionally or alternatively, the communications manager 620 may support wireless communications at a UE in accordance with examples as disclosed herein. For example, the communications manager 620 may be configured as or otherwise support a means for receiving, from a first cell, signaling indicating for the UE to perform a first set of one or more measurements on a first wireless link between the UE and the first cell, where the one or more measurements are configured exclusively for a first network subscription of the UE. The communications manager 620 may be configured as or otherwise support a means for performing the first set of one or more measurements on the first wireless link using a second network subscription of the UE. The communications manager 620 may be configured as or otherwise support a means for transmitting, using the first network subscription, a first measurement report based on performing the first set of one or more measurements via the second network subscription.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources, for example via performing network measurements via the hardware resources best suited to perform the network measurements.

Figure 7:
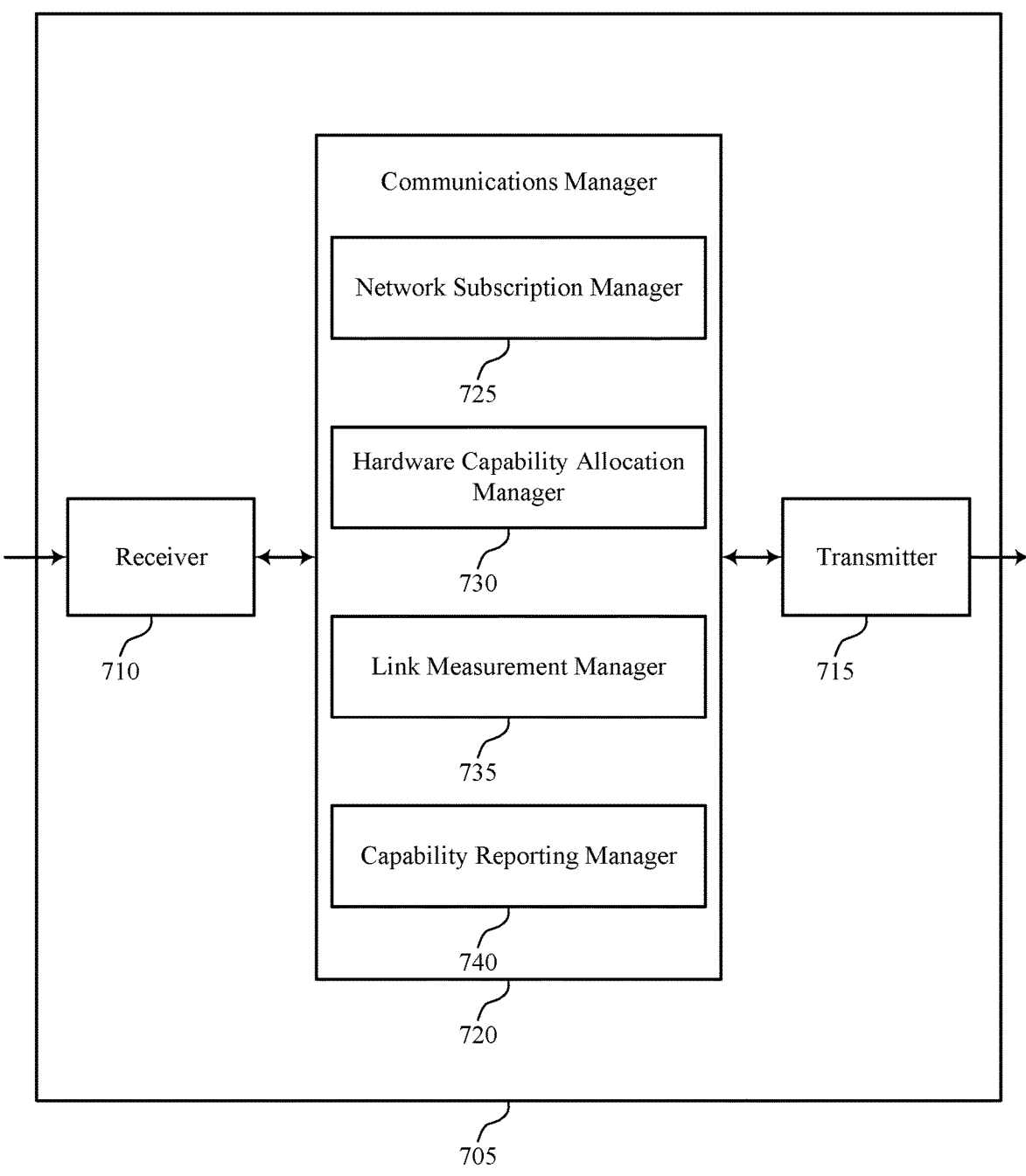

FIG. 7 shows a block diagram 700 of a device 705 that supports hardware capability reallocation for a UE in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to hardware capability reallocation for a UE). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to hardware capability reallocation for a UE). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of hardware capability reallocation for a UE as described herein. For example, the communications manager 720 may include a network subscription manager 725, a hardware capability allocation manager 730, a link measurement manager 735, a capability reporting manager 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The network subscription manager 725 may be configured as or otherwise support a means for communicating via a first network subscription and a second network subscription according to a first allocation of a hardware capability of the UE, where the first allocation includes a first subset of the hardware capability of the UE being associated with the first network subscription and a second subset of the hardware capability of the UE being associated with the second network subscription. The hardware capability allocation manager 730 may be configured as or otherwise support a means for configuring a second allocation of the hardware capability of the UE, where the second allocation includes a third subset of the hardware capability of the UE being associated with the first network subscription and a fourth subset of the hardware capability of the UE being associated with the second network subscription, where the first subset of the hardware capability is different from the third subset of the hardware capability of the UE and the second subset of the hardware capability is different from the fourth subset of the hardware capability of the UE. The network subscription manager 725 may be configured as or otherwise support a means for communicating via the first network subscription and the second network subscription according to the second allocation of the hardware capability of the UE.

Additionally or alternatively, the communications manager 720 may support wireless communications at a UE in accordance with examples as disclosed herein. The link measurement manager 735 may be configured as or otherwise support a means for receiving, from a first cell, signaling indicating for the UE to perform a first set of one or more measurements on a first wireless link between the UE and the first cell, where the one or more measurements are configured exclusively for a first network subscription of the UE. The link measurement manager 735 may be configured as or otherwise support a means for performing the first set of one or more measurements on the first wireless link using a second network subscription of the UE. The capability reporting manager 740 may be configured as or otherwise support a means for transmitting, using the first network subscription, a first measurement report based on performing the first set of one or more measurements via the second network subscription.

Figure 8:
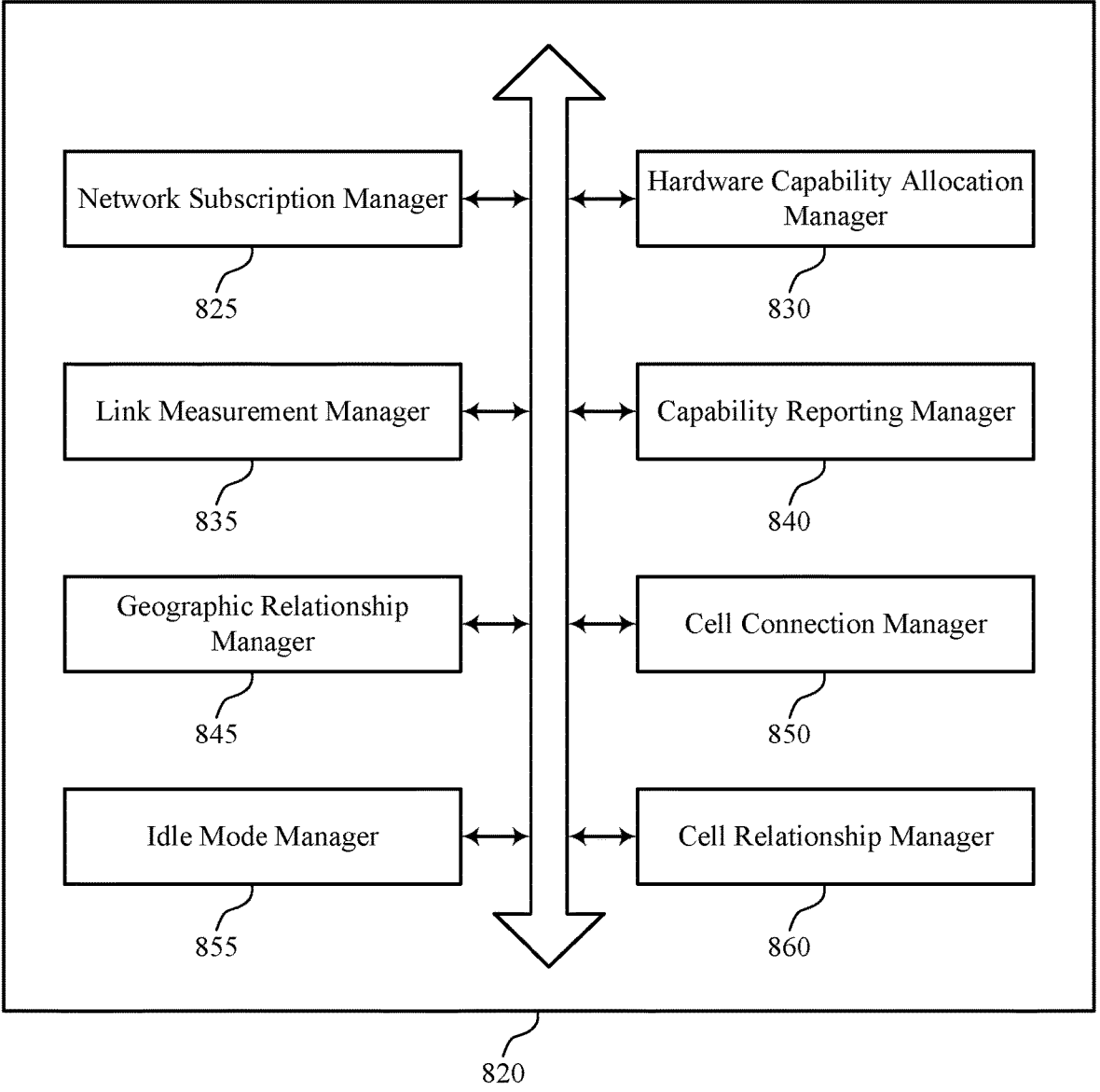
FIG. 8 shows a block diagram of a communications manager that supports hardware capability reallocation for a UE in accordance with aspects of the present disclosure.

FIG. 8 shows a block diagram 800 of a communications manager 820 that supports hardware capability reallocation for a UE in accordance with aspects of the present disclosure. The communications manager 820 may be an example of aspects of a communications manager 620, a communications manager 720, or both, as described herein. The communications manager 820, or various components thereof, may be an example of means for performing various aspects of hardware capability reallocation for a UE as described herein. For example, the communications manager 820 may include a network subscription manager 825, a hardware capability allocation manager 830, a link measurement manager 835, a capability reporting manager 840, a geographic relationship manager 845, a cell connection manager 850, an idle mode manager 855, a cell relationship manager 860, or any combination thereof. Each of these components may communicate, directly or indirectly, with one another (e.g., via one or more buses).

The communications manager 820 may support wireless communications at a UE in accordance with examples as disclosed herein. The network subscription manager 825 may be configured as or otherwise support a means for communicating via a first network subscription and a second network subscription according to a first allocation of a hardware capability of the UE, where the first allocation includes a first subset of the hardware capability of the UE being associated with the first network subscription and a second subset of the hardware capability of the UE being associated with the second network subscription. The hardware capability allocation manager 830 may be configured as or otherwise support a means for configuring a second allocation of the hardware capability of the UE, where the second allocation includes a third subset of the hardware capability of the UE being associated with the first network subscription and a fourth subset of the hardware capability of the UE being associated with the second network subscription, where the first subset of the hardware capability is different from the third subset of the hardware capability of the UE and the second subset of the hardware capability is different from the fourth subset of the hardware capability of the UE. In some examples, the network subscription manager 825 may be configured as or otherwise support a means for communicating via the first network subscription and the second network subscription according to the second allocation of the hardware capability of the UE.

In some examples, the geographic relationship manager 845 may be configured as or otherwise support a means for storing the second allocation in a memory of the UE in association with a determined geographic location of the UE.

In some examples, the geographic relationship manager 845 may be configured as or otherwise support a means for determining that the second allocation is associated with a current or predicted geographic location of the UE, where configuring the second allocation of the hardware capability of the UE is based on the second allocation being associated with the current or predicted geographic location of the UE.

In some examples, the geographic relationship manager 845 may be configured as or otherwise support a means for transmitting, to one or more cells prior to configuring the second allocation, one or more measurement reports associated with the current or predicted geographic location. In some examples, the geographic relationship manager 845 may be configured as or otherwise support a means for storing, in a memory of the UE, the one or more measurement reports, where the determining is based on storing the one or more measurement reports.

In some examples, the geographic relationship manager 845 may be configured as or otherwise support a means for predicting a geographic location based on user data stored in memory of the UE, where configuring the second allocation of the hardware capability of the UE is based on the second allocation being associated with the predicted geographic location.

In some examples, the geographic relationship manager 845 may be configured as or otherwise support a means for predicting a mobility path of the UE, where configuring the second allocation of the hardware capability of the UE is based on the second allocation being associated with the predicted mobility path.

In some examples, predicting the mobility path is based on a machine learning algorithm and one or more past measurement reports stored in a memory of the UE.

In some examples, the cell connection manager 850 may be configured as or otherwise support a means for determining that the second allocation is associated with a first cell that is connected with the UE via the first network subscription, where configuring the second allocation of the hardware capability of the UE is based on the second allocation being associated with the first cell.

In some examples, the cell connection manager 850 may be configured as or otherwise support a means for predicting a cell for subsequent communications by UE via the first network subscription, where configuring the second allocation of the hardware capability of the UE is based on the second allocation being associated with the predicted cell.

In some examples, the idle mode manager 855 may be configured as or otherwise support a means for determining that the second network subscription is in an idle mode, where configuring the second allocation of the hardware capability of the UE is based on the second network subscription being in the idle mode.

In some examples, the idle mode manager 855 may be configured as or otherwise support a means for determining that the second network subscription is no longer in the idle mode. In some examples, the network subscription manager 825 may be configured as or otherwise support a means for communicating via the first network subscription and the second network subscription according to the first allocation after determining that the second network subscription is no longer in the idle mode.

In some examples, the fourth subset includes a portion of the hardware capability of the UE sufficient to support page decode operations and mobile terminated voice call operations. In some examples, the third subset includes a remainder of the hardware capability of the UE.

In some examples, the first subset includes more of the hardware capability of the UE than the second subset. In some examples, the fourth subset includes more of the hardware capability of the UE than the third subset.

In some examples, the first subset and the second subset cumulatively include a total hardware capability of the UE. In some examples, the third subset and the fourth subset cumulatively include the total hardware capability of the UE.

In some examples, the cell relationship manager 860 may be configured as or otherwise support a means for storing the second allocation in a memory of the UE in association with at least one of a first cell associated with the first network subscription or a second cell associated with the second network subscription.

In some examples, the hardware capability of the UE includes a supported bandwidth, a supported multiple-input multiple-output rank, a supported quantity of one or more component carriers, a supported quantity of one or more layers per configured component carrier, or any combination thereof.

In some examples, the capability reporting manager 840 may be configured as or otherwise support a means for reporting first data associated with the first subset to a first cell in communication with the UE via the first network subscription. In some examples, the capability reporting manager 840 may be configured as or otherwise support a means for reporting second data associated with the second subset to a second cell in communication with the UE via the second network subscription.

In some examples, the first network subscription is associated with a first subscriber identification module card inserted into a first card slot of the UE and the second network subscription is associated with a second subscriber identification module card inserted into a second card slot of the UE.

In some examples, the first allocation is based on the first subscriber identification module card being inserted into the first card slot and the second subscriber identification module card being inserted into the second card slot.

Additionally or alternatively, the communications manager 820 may support wireless communications at a UE in accordance with examples as disclosed herein. The link measurement manager 835 may be configured as or otherwise support a means for receiving, from a first cell, signaling indicating for the UE to perform a first set of one or more measurements on a first wireless link between the UE and the first cell, where the one or more measurements are configured exclusively for a first network subscription of the UE. In some examples, the link measurement manager 835 may be configured as or otherwise support a means for performing the first set of one or more measurements on the first wireless link using a second network subscription of the UE. The capability reporting manager 840 may be configured as or otherwise support a means for transmitting, using the first network subscription, a first measurement report based on performing the first set of one or more measurements via the second network subscription.

In some examples, the capability reporting manager 840 may be configured as or otherwise support a means for storing the first measurement report in a memory of the UE in association with the first network subscription.

In some examples, the geographic relationship manager 845 may be configured as or otherwise support a means for storing a geographic location in the memory of the UE in association with the first measurement report.

In some examples, the hardware capability allocation manager 830 may be configured as or otherwise support a means for identifying that one or more hardware capabilities of the UE are associated with the second network subscription, where performing the first set of one or more measure-ments using the second network subscription including performing the first set of one or more measurements using the one or more hardware capabilities of the UE associated with the second network subscription.

In some examples, the one or more hardware capabilities of the UE include a supported bandwidth, a supported multiple-input multiple-output rank, a supported quantity of one or more component carriers, a supported quantity of one or more layers per configured component carrier, or any combination thereof.

In some examples, the hardware capability allocation manager 830 may be configured as or otherwise support a means for identifying an allocation of a hardware capability of the UE, where the identified allocation includes a first subset of the hardware capability of the UE being associated with the first network subscription and a second subset of the hardware capability of the UE being associated with the second network subscription. In some examples, the link measurement manager 835 may be configured as or otherwise support a means for determining to perform the first set of one or more measurements using the second network subscription based on the identified allocation.

In some examples, the first network subscription is associated with a first subscriber identification module card inserted into a first card slot of the UE and the second network subscription is associated with a second subscriber identification module card inserted into a second card slot of the UE.

In some examples, the allocation is based on the first subscriber identification module card being inserted into the first card slot and the second subscriber identification module card being inserted into the second card slot.

In some examples, the idle mode manager 855 may be configured as or otherwise support a means for identifying that the first network subscription is in an idle mode, where performing the first set of one or more measurements via the second network subscription is based on the first network subscription being in the idle mode.

In some examples, the hardware capability allocation manager 830 may be configured as or otherwise support a means for identifying a dynamic configuration of a hardware capability associated with the first network subscription and the second network subscription, where performing the first set of one or more measurements via the second network subscription is based on the dynamic configuration of the hardware capability.

In some examples, the first network subscription is associated with a first network operator and the second network subscription is associated with a second network operator different from the first network operator.

In some examples, the link measurement manager 835 may be configured as or otherwise support a means for receiving, from a second cell, second signaling indicating for the UE to perform a second set of one or more measurements on a second wireless link between the UE and the second cell, where the one or more measurements are configured exclusively for the second network subscription. In some examples, the link measurement manager 835 may be configured as or otherwise support a means for performing the second set of one or more measurements on the second wireless link using the first network subscription. In some examples, the capability reporting manager 840 may be configured as or otherwise support a means for transmitting, using the second network subscription, a second measurement report based on performing the second set of one or more measurements via the second network subscription.

Figure 9:
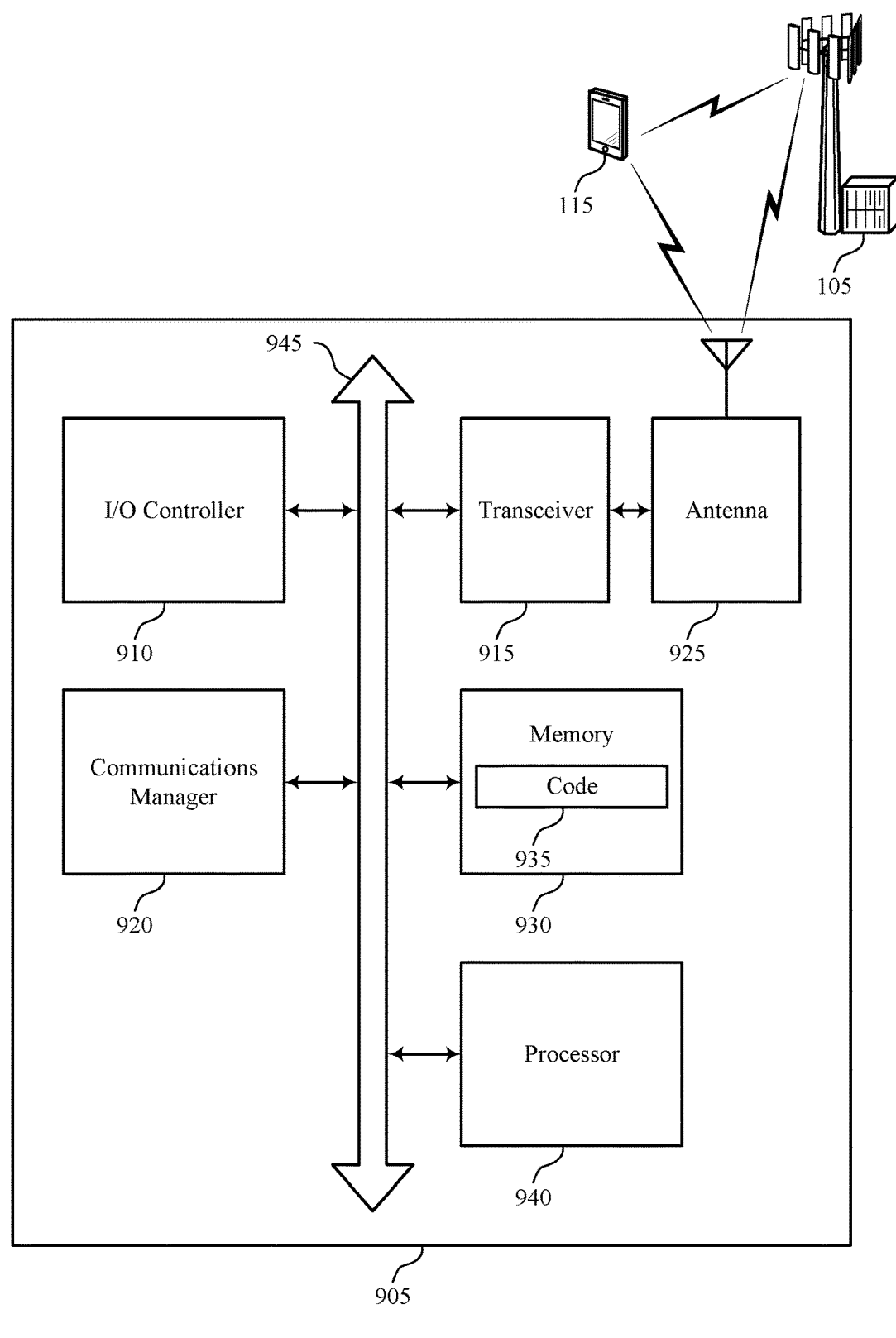
FIG. 9 shows a diagram of a system including a device that supports hardware capability reallocation for a UE in accordance with aspects of the present disclosure.

FIG. 9 shows a diagram of a system 900 including a device 905 that supports hardware capability reallocation for a UE in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting hardware capability reallocation for a UE). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for communicating via a first network subscription and a second network subscription according to a first allocation of a hardware capability of the UE, where the first allocation includes a first subset of the hardware capability of the UE being associated with the first network subscription and a second subset of the hardware capability of the UE being associated with the second network subscription. The communications manager 920 may be configured as or otherwise support a means for configuring a second allocation of the hardware capability of the UE, where the second allocation includes a third subset of the hardware capability of the UE being associated with the first network subscription and a fourth subset of the hardware capability of the UE being associated with the second network subscription, where the first subset of the hardware capability is different from the third subset of the hardware capability of the UE and the second subset of the hardware capability is different from the fourth subset of the hardware capability of the UE. The communications manager 920 may be configured as or otherwise support a means for communicating via the first network subscription and the second network subscription according to the second allocation of the hardware capability of the UE.

Additionally or alternatively, the communications manager 920 may support wireless communications at a UE in accordance with examples as disclosed herein. For example, the communications manager 920 may be configured as or otherwise support a means for receiving, from a first cell, signaling indicating for the UE to perform a first set of one or more measurements on a first wireless link between the UE and the first cell, where the one or more measurements are configured exclusively for a first network subscription of the UE. The communications manager 920 may be configured as or otherwise support a means for performing the first set of one or more measurements on the first wireless link using a second network subscription of the UE. The communications manager 920 may be configured as or otherwise support a means for transmitting, using the first network subscription, a first measurement report based on performing the first set of one or more measurements via the second network subscription.

By including or configuring the communications manager 920 in accordance with examples as described herein, the device 905 may support techniques for improved communication reliability, more efficient utilization of communication resources, improved coordination between devices, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of hardware capability reallocation for a UE as described herein, or the processor 940 and the memory 930 may be otherwise configured to perform or support such operations.

FIG. 10 shows a flowchart illustrating a method 1000 that supports hardware capability reallocation for a UE in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include communicating via a first network subscription and a second network subscription according to a first allocation of a hardware capability of the UE, where the first allocation includes a first subset of the hardware capability of the UE being associated with the first network subscription and a second subset of the hardware capability of the UE being associated with the second network subscription. The operations of 1005 may be performed in accordance with examples as disclosed herein. In some examples, aspects of the operations of 1005 may be performed by a network subscription manager 825 as described with reference to FIG. 8. Additionally or alternatively, means for performing 1005 may, but not necessarily, include, for example, antenna 925, transceiver 915, communications manager 920, memory 930 (including code 935), processor 940 and/or bus 945 as described with reference to FIG. 9.

At 1010, the method may include configuring a second allocation of the hardware capability of the UE, where the second allocation includes a third subset of the hardware capability of the UE being associated with the first network subscription and a fourth subset of the hardware capability of the UE being associated with the second network subscription, where the first subset of the hardware capability is different from the third subset of the hardware capability of the UE and the second subset of the hardware capability is different from the fourth subset of the hardware capability of the UE. The operations of 1010 may be performed in accordance with examples as disclosed herein. In some examples, aspects of the operations of 1010 may be performed by a hardware capability allocation manager 830 as described with reference to FIG. 8. Additionally or alternatively, means for performing 1010 may, but not necessarily, include, for example, antenna 925, transceiver 915, communications manager 920, memory 930 (including code 935), processor 940 and/or bus 945 as described with reference to FIG. 9.

At 1015, the method may include communicating via the first network subscription and the second network subscription according to the second allocation of the hardware capability of the UE. The operations of 1015 may be performed in accordance with examples as disclosed herein. In some examples, aspects of the operations of 1015 may be performed by a network subscription manager 825 as described with reference to FIG. 8. Additionally or alternatively, means for performing 1015 may, but not necessarily, include, for example, antenna 925, transceiver 915, communications manager 920, memory 930 (including code 935), processor 940 and/or bus 945 as described with reference to FIG. 9.

FIG. 11 shows a flowchart illustrating a method 1100 that supports hardware capability reallocation for a UE in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include communicating via a first network subscription and a second network subscription according to a first allocation of a hardware capability of the UE, where the first allocation includes a first subset of the hardware capability of the UE being associated with the first network subscription and a second subset of the hardware capability of the UE being associated with the second network subscription. The operations of 1105 may be performed in accordance with examples as disclosed herein. In some examples, aspects of the operations of 1105 may be performed by a network subscription manager 825 as described with reference to FIG. 8. Additionally or alternatively, means for performing 1105 may, but not necessarily, include, for example, antenna 925, transceiver 915, communications manager 920, memory 930 (including code 935), processor 940 and/or bus 945 as described with reference to FIG. 9.

At 1110, the method may include determining that a second allocation is associated with a current or predicted geographic location of the UE, where the second allocation includes a third subset of the hardware capability of the UE being associated with the first network subscription and a fourth subset of the hardware capability of the UE being associated with the second network subscription, where the first subset of the hardware capability is different from the third subset of the hardware capability of the UE and the second subset of the hardware capability is different from the fourth subset of the hardware capability of the UE. The operations of 1110 may be performed in accordance with examples as disclosed herein. In some examples, aspects of the operations of 1110 may be performed by a geographic relationship manager 845 as described with reference to FIG. 8. Additionally or alternatively, means for performing 1110 may, but not necessarily, include, for example, antenna 925, transceiver 915, communications manager 920, memory 930 (including code 935), processor 940 and/or bus 945 as described with reference to FIG. 9.

At 1115, the method may include configuring the second allocation of the hardware capability of the UE based on the second allocation being associated with the current or predicted geographic location of the UE. The operations of 1115 may be performed in accordance with examples as disclosed herein. In some examples, aspects of the operations of 1115 may be performed by a hardware capability allocation manager 830 as described with reference to FIG. 8. Additionally or alternatively, means for performing 1115 may, but not necessarily, include, for example, antenna 925, transceiver 915, communications manager 920, memory 930 (including code 935), processor 940 and/or bus 945 as described with reference to FIG. 9.

At 1120, the method may include communicating via the first network subscription and the second network subscription according to the second allocation of the hardware capability of the UE. The operations of 1120 may be performed in accordance with examples as disclosed herein. In some examples, aspects of the operations of 1120 may be performed by a network subscription manager 825 as described with reference to FIG. 8. Additionally or alternatively, means for performing 1120 may, but not necessarily, include, for example, antenna 925, transceiver 915, communications manager 920, memory 930 (including code 935), processor 940 and/or bus 945 as described with reference to FIG. 9.

FIG. 12 shows a flowchart illustrating a method 1200 that supports hardware capability reallocation for a UE in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include communicating via a first network subscription and a second network subscription according to a first allocation of a hardware capability of the UE, where the first allocation includes a first subset of the hardware capability of the UE being associated with the first network subscription and a second subset of the hardware capability of the UE being associated with the second network subscription. The operations of 1205 may be performed in accordance with examples as disclosed herein. In some examples, aspects of the operations of 1205 may be performed by a network subscription manager 825 as described with reference to FIG. 8. Additionally or alternatively, means for performing 1205 may, but not necessarily, include, for example, antenna 925, transceiver 915, communications manager 920, memory 930 (including code 935), processor 940 and/or bus 945 as described with reference to FIG. 9.

At 1210, the method may include determining that the second network subscription is in an idle mode. The operations of 1210 may be performed in accordance with examples as disclosed herein. In some examples, aspects of the operations of 1210 may be performed by an idle mode manager 855 as described with reference to FIG. 8. Additionally or alternatively, means for performing 1210 may, but not necessarily, include, for example, antenna 925, transceiver 915, communications manager 920, memory 930 (including code 935), processor 940 and/or bus 945 as described with reference to FIG. 9.

At 1215, the method may include configuring a second allocation of the hardware capability of the UE, where the second allocation includes a third subset of the hardware capability of the UE being associated with the first network subscription and a fourth subset of the hardware capability of the UE being associated with the second network subscription, where the first subset of the hardware capability is different from the third subset of the hardware capability of the UE and the second subset of the hardware capability is different from the fourth subset of the hardware capability of the UE, and where configuring the second allocation of the hardware capability of the UE is based on the second network subscription being in the idle mode. The operations of 1215 may be performed in accordance with examples as disclosed herein. In some examples, aspects of the operations of 1215 may be performed by a hardware capability allocation manager 830 as described with reference to FIG. 8. Additionally or alternatively, means for performing 1215 may, but not necessarily, include, for example, antenna 925, transceiver 915, communications manager 920, memory 930 (including code 935), processor 940 and/or bus 945 as described with reference to FIG. 9.

At 1220, the method may include communicating via the first network subscription and the second network subscription according to the second allocation of the hardware capability of the UE. The operations of 1220 may be performed in accordance with examples as disclosed herein. In some examples, aspects of the operations of 1220 may be performed by a network subscription manager 825 as described with reference to FIG. 8. Additionally or alternatively, means for performing 1220 may, but not necessarily, include, for example, antenna 925, transceiver 915, communications manager 920, memory 930 (including code 935), processor 940 and/or bus 945 as described with reference to FIG. 9.

FIG. 13 shows a flowchart illustrating a method 1300 that supports hardware capability reallocation for a UE in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving, from a first cell, signaling indicating for the UE to perform a first set of one or more measurements on a first wireless link between the UE and the first cell, where the one or more measurements are configured exclusively for a first network subscription of the UE. The operations of 1305 may be performed in accordance with examples as disclosed herein. In some examples, aspects of the operations of 1305 may be performed by a link measurement manager 835 as described with reference to FIG. 8. Additionally or alternatively, means for performing 1305 may, but not necessarily, include, for example, antenna 925, transceiver 915, communications manager 920, memory 930 (including code 935), processor 940 and/or bus 945 as described with reference to FIG. 9.

At 1310, the method may include performing the first set of one or more measurements on the first wireless link using a second network subscription of the UE. The operations of 1310 may be performed in accordance with examples as disclosed herein. In some examples, aspects of the operations of 1310 may be performed by a link measurement manager 835 as described with reference to FIG. 8. Additionally or alternatively, means for performing 1310 may, but not necessarily, include, for example, antenna 925, transceiver 915, communications manager 920, memory 930

(including code 935), processor 940 and/or bus 945 as described with reference to FIG. 9.

At 1315, the method may include transmitting, using the first network subscription, a first measurement report based on performing the first set of one or more measurements via the second network subscription. The operations of 1315 may be performed in accordance with examples as disclosed herein. In some examples, aspects of the operations of 1315 may be performed by a capability reporting manager 840 as described with reference to FIG. 8. Additionally or alternatively, means for performing 1315 may, but not necessarily, include, for example, antenna 925, transceiver 915, communications manager 920, memory 930 (including code 935), processor 940 and/or bus 945 as described with reference to FIG. 9.

FIG. 14 shows a flowchart illustrating a method 1400 that supports hardware capability reallocation for a UE in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a first cell, signaling indicating for the UE to perform a first set of one or more measurements on a first wireless link between the UE and the first cell, where the one or more measurements are configured exclusively for a first network subscription of the UE. The operations of 1405 may be performed in accordance with examples as disclosed herein. In some examples, aspects of the operations of 1405 may be performed by a link measurement manager 835 as described with reference to FIG. 8. Additionally or alternatively, means for performing 1405 may, but not necessarily, include, for example, antenna 925, transceiver 915, communications manager 920, memory 930 (including code 935), processor 940 and/or bus 945 as described with reference to FIG. 9.

At 1410, the method may include identifying an allocation of a hardware capability of the UE, where the identified allocation includes a first subset of the hardware capability of the UE being associated with the first network subscription and a second subset of the hardware capability of the UE being associated with the second network subscription. The operations of 1410 may be performed in accordance with examples as disclosed herein. In some examples, aspects of the operations of 1410 may be performed by a hardware capability allocation manager 830 as described with reference to FIG. 8. Additionally or alternatively, means for performing 1410 may, but not necessarily, include, for example, antenna 925, transceiver 915, communications manager 920, memory 930 (including code 935), processor 940 and/or bus 945 as described with reference to FIG. 9.

At 1415, the method may include determining to perform the first set of one or more measurements using the second network subscription based on the identified allocation. The operations of 1415 may be performed in accordance with examples as disclosed herein. In some examples, aspects of the operations of 1415 may be performed by a link measurement manager 835 as described with reference to FIG. 8. Additionally or alternatively, means for performing 1415 may, but not necessarily, include, for example, antenna 925, transceiver 915, communications manager 920, memory 930 (including code 935), processor 940 and/or bus 945 as described with reference to FIG. 9.

At 1420, the method may include performing the first set of one or more measurements on the first wireless link using a second network subscription of the UE. The operations of 1420 may be performed in accordance with examples as disclosed herein. In some examples, aspects of the operations of 1420 may be performed by a link measurement manager 835 as described with reference to FIG. 8. Additionally or alternatively, means for performing 1420 may, but not necessarily, include, for example, antenna 925, transceiver 915, communications manager 920, memory 930 (including code 935), processor 940 and/or bus 945 as described with reference to FIG. 9.

At 1425, the method may include transmitting, using the first network subscription, a first measurement report based on performing the first set of one or more measurements via the second network subscription. The operations of 1425 may be performed in accordance with examples as disclosed herein. In some examples, aspects of the operations of 1425 may be performed by a capability reporting manager 840 as described with reference to FIG. 8. Additionally or alternatively, means for performing 1425 may, but not necessarily, include, for example, antenna 925, transceiver 915, communications manager 920, memory 930 (including code 935), processor 940 and/or bus 945 as described with reference to FIG. 9.

The following provides an overview of aspects of the present disclosure:

Aspect 1: A method for wireless communications at a UE, comprising: receiving, from a first cell, signaling indicating for the UE to perform a first set of one or more measurements on a first wireless link between the UE and the first cell, wherein the one or more measurements are configured exclusively for a first network subscription of the UE; performing the first set of one or more measurements on the first wireless link using a second network subscription of the UE; and transmitting, using the first network subscription, a first measurement report based at least in part on performing the first set of one or more measurements via the second network subscription.

Aspect 2: The method of aspect 1, further comprising: storing the first measurement report in a memory of the UE in association with the first network subscription.

Aspect 3: The method of aspect 3, further comprising: storing a geographic location in the memory of the UE in association with the first measurement report.

Aspect 4: The method of any of aspects 1 through 3, further comprising: identifying that one or more hardware capabilities of the UE are associated with the second network subscription, wherein performing the first set of one or more measurements using the second network subscription comprising performing the first set of one or more measurements using the one or more hardware capabilities of the UE associated with the second network subscription.

Aspect 5: The method of aspect 4, wherein the one or more hardware capabilities of the UE comprise a supported bandwidth, a supported multiple-input multiple-output rank, a supported quantity of one or more component carriers, a supported quantity of one or more layers per configured component carrier, or any combination thereof Aspect 6: The method of any of aspects 1 through 5, further comprising: identifying an allocation of a hardware capability of the UE, wherein the identified allocation comprises a first subset of the hardware capability of the UE being associated with the first network subscription and a second subset of the hardware capability of the UE being associated with the second network subscription; and determining to perform the first set of one or more measurements using the second network subscription based at least in part on the identified allocation.

Aspect 7: The method of aspect 6, wherein the first network subscription is associated with a first subscriber identification module card inserted into a first card slot of the UE and the second network subscription is associated with a second subscriber identification module card inserted into a second card slot of the UE.

Aspect 8: The method of aspect 7, wherein the allocation is based at least in part on the first subscriber identification module card being inserted into the first card slot and the second subscriber identification module card being inserted into the second card slot.

Aspect 9: The method of any of aspects 1 through 8, further comprising: identifying that the first network subscription is in an idle mode, wherein performing the first set of one or more measurements via the second network subscription is based at least in part on the first network subscription being in the idle mode.

Aspect 10: The method of any of aspects 1 through 9, further comprising: identifying a dynamic configuration of a hardware capability associated with the first network subscription and the second network subscription, wherein performing the first set of one or more measurements via the second network subscription is based at least in part on the dynamic configuration of the hardware capability.

Aspect 11: The method of any of aspects 1 through 10, wherein the first network subscription is associated with a first network operator and the second network subscription is associated with a second network operator different from the first network operator.

Aspect 12: The method of any of aspects 1 through 11, further comprising: receiving, from a second cell, second signaling indicating for the UE to perform a second set of one or more measurements on a second wireless link between the UE and the second cell, wherein the one or more measurements are configured exclusively for the second network subscription; performing the second set of one or more measurements on the second wireless link using the first network subscription; and transmitting, using the second network subscription, a second measurement report based at least in part on performing the second set of one or more measurements via the second network subscription.

Aspect 13: An apparatus for wireless communications at a UE, comprising a processor; a transceiver coupled with the processor; and memory coupled with the processor, the memory and the processor configured to cause the apparatus to perform a method of any of aspects 1 through 12.

Aspect 14: An apparatus for wireless communications at a UE, comprising at least one means for performing a method of any of aspects 1 through 12.

Aspect 15: A non-transitory computer-readable medium storing code for wireless communications at a UE, the code comprising instructions executable by a processor to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or FDD AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a first cell, signaling indicating for the UE to perform a first set of one or more measurements on a first wireless link between the UE and the first cell, wherein the first set of one or more measurements is configured exclusively for a first network subscription of the UE, wherein an allocation of a hardware capability of the UE comprises a first subset of the hardware capability of the UE being associated with the first network subscription and a second subset of the hardware capability of the UE being associated with a second network subscription, and wherein the allocation is based at least in part on a difference in network conditions between the first network subscription and the second network subscription;
   performing, based at least in part on the allocation, the first set of one or more measurements on the first wireless link using the second network subscription of the UE; and
   transmitting, using the first network subscription, a first measurement report based at least in part on performing the first set of one or more measurements via the second network subscription.

2. The method of claim 1, further comprising:
   storing the first measurement report in a memory of the UE in association with the first network subscription.

3. The method of claim 2, further comprising:
   storing a geographic location in the memory of the UE in association with the first measurement report.

4. The method of claim 1, wherein the allocation of the hardware capability comprises a supported bandwidth, a supported multiple-input multiple-output rank, a supported quantity of one or more component carriers, a supported quantity of one or more layers per configured component carrier, or any combination thereof.

5. The method of claim 1, wherein the first network subscription is associated with a first subscriber identification module card inserted into a first card slot of the UE and the second network subscription is associated with a second subscriber identification module card inserted into a second card slot of the UE.

6. The method of claim 5, wherein the allocation is based at least in part on the first subscriber identification module card being inserted into the first card slot and the second subscriber identification module card being inserted into the second card slot.

7. The method of claim 1, further comprising:
   identifying that the first network subscription is in an idle mode, wherein performing the first set of one or more measurements via the second network subscription is based at least in part on the first network subscription being in the idle mode.

8. The method of claim 1, further comprising:
   identifying a dynamic configuration of a hardware capability associated with the first network subscription and the second network subscription, wherein performing the first set of one or more measurements via the second network subscription is based at least in part on the dynamic configuration of the hardware capability.

9. The method of claim 1, wherein the first network subscription is associated with a first network operator and the second network subscription is associated with a second network operator different from the first network operator.

10. The method of claim 1, further comprising:
receiving, from a second cell, second signaling indicating for the UE to perform a second set of one or more measurements on a second wireless link between the UE and the second cell, wherein the second set of one or more measurements is configured exclusively for the second network subscription;
performing the second set of one or more measurements on the second wireless link using the first network subscription; and
transmitting, using the second network subscription, a second measurement report based at least in part on performing the second set of one or more measurements via the second network subscription.

11. An apparatus for wireless communications, comprising:
a processor of a user equipment (UE);
a transceiver coupled with the processor; and
memory coupled with the processor, the memory and the processor configured to:
receive, from a first cell via the transceiver, signaling indicating for the UE to perform a first set of one or more measurements on a first wireless link between the UE and the first cell, wherein the first set of one or more measurements is configured exclusively for a first network subscription of the UE, wherein an allocation of a hardware capability of the UE comprises a first subset of the hardware capability of the UE being associated with the first network subscription and a second subset of the hardware capability of the UE being associated with a second network subscription, and wherein the allocation is based at least in part on a difference in network conditions between the first network subscription and the second network subscription;
perform, based at least in part on the allocation, the first set of one or more measurements on the first wireless link using the second network subscription of the UE; and
transmit, via the transceiver and using the first network subscription, a first measurement report based at least in part on performing the first set of one or more measurements via the second network subscription.

12. The apparatus of claim 11, the memory and the processor further configured to cause the apparatus to:
store the first measurement report in a memory of the UE in association with the first network subscription.

13. The apparatus of claim 12, the memory and the processor further configured to cause the apparatus to:
store a geographic location in the memory of the UE in association with the first measurement report.

14. The apparatus of claim 11, wherein the allocation of the hardware capability comprises a supported bandwidth, a supported multiple-input multiple-output rank, a supported quantity of one or more component carriers, a supported quantity of one or more layers per configured component carrier, or any combination thereof.

15. The apparatus of claim 11, wherein the first network subscription is associated with a first subscriber identification module card inserted into a first card slot of the UE and the second network subscription is associated with a second subscriber identification module card inserted into a second card slot of the UE.

16. The apparatus of claim 15, wherein the allocation is based at least in part on the first subscriber identification module card being inserted into the first card slot and the second subscriber identification module card being inserted into the second card slot.

17. The apparatus of claim 11, the memory and the processor further configured to cause the apparatus to:
identify that the first network subscription is in an idle mode, wherein performing the first set of one or more measurements via the second network subscription is based at least in part on the first network subscription being in the idle mode.

18. The apparatus of claim 11, the memory and the processor further configured to cause the apparatus to:
identify a dynamic configuration of a hardware capability associated with the first network subscription and the second network subscription, wherein performing the first set of one or more measurements via the second network subscription is based at least in part on the dynamic configuration of the hardware capability.

19. The apparatus of claim 11, wherein the first network subscription is associated with a first network operator and the second network subscription is associated with a second network operator different from the first network operator.

20. The apparatus of claim 11, the memory and the processor further configured to cause the apparatus to:
receive, via the transceiver, from a second cell, second signaling indicating for the UE to perform a second set of one or more measurements on a second wireless link between the UE and the second cell, wherein the second set of one or more measurements is configured exclusively for the second network subscription;
perform the second set of one or more measurements on the second wireless link using the first network subscription; and
transmit, via the transceiver, using the second network subscription, a second measurement report based at least in part on performing the second set of one or more measurements via the second network subscription.

21. An apparatus for wireless communications at a user equipment (UE), comprising:
means for receiving, from a first cell, signaling indicating for the UE to perform a first set of one or more measurements on a first wireless link between the UE and the first cell, wherein the first set of one or more measurements is configured exclusively for a first network subscription of the UE, wherein an allocation of a hardware capability of the UE comprises a first subset of the hardware capability of the UE being associated with the first network subscription and a second subset of the hardware capability of the UE being associated with a second network subscription, and wherein the allocation is based at least in part on a difference in network conditions between the first network subscription and the second network subscription;
means for performing, based at least in part on the allocation, the first set of one or more measurements on the first wireless link using the second network subscription of the UE; and
means for transmitting, using the first network subscription, a first measurement report based at least in part on performing the first set of one or more measurements via the second network subscription.

22. The apparatus of claim 21, further comprising:
means for storing the first measurement report in a memory of the UE in association with the first network subscription.

23. The apparatus of claim 22, further comprising:
means for storing a geographic location in the memory of
    the UE in association with the first measurement report.

24. A non-transitory computer-readable medium storing
code for wireless communications at a user equipment (UE),
the code comprising instructions executable by a processor
to:
    receive, from a first cell, signaling indicating for the UE
        to perform a first set of one or more measurements on
        a first wireless link between the UE and the first cell,
        wherein the first set of one or more measurements is
        configured exclusively for a first network subscription
        of the UE, wherein an allocation of a hardware capa-
        bility comprises a first subset of the hardware capability
        of the UE being associated with the first network
        subscription and a second subset of the hardware
        capability of the UE being associated with a second
        network subscription, and wherein the allocation is
        based at least in part on a difference in network
        conditions between the first network subscription and
        the second network subscription;
    perform, based at least in part on the allocation, the first
        set of one or more measurements on the first wireless
        link using the second network subscription of the UE;
        and
    transmit, using the first network subscription, a first
        measurement report based at least in part on performing
        the first set of one or more measurements via the second
        network subscription.

* * * * *